US010216608B1

(12) United States Patent
Arguelles

(10) Patent No.: US 10,216,608 B1
(45) Date of Patent: Feb. 26, 2019

(54) LOAD TESTING WITH AUTOMATED SERVICE DEPENDENCY DISCOVERY

(71) Applicant: Amazon Technologies, Inc., Seattle, WA (US)

(72) Inventor: Carlos Alejandro Arguelles, Shoreline, WA (US)

(73) Assignee: Amazon Technologies, Inc., Seattle, WA (US)

( * ) Notice: Subject to any disclaimer, the term of this patent is extended or adjusted under 35 U.S.C. 154(b) by 304 days.

(21) Appl. No.: 14/632,976

(22) Filed: Feb. 26, 2015

(51) Int. Cl.
G06F 9/44 (2018.01)
G06F 11/36 (2006.01)

(52) U.S. Cl.
CPC ...... G06F 11/3612 (2013.01); G06F 11/3664 (2013.01); G06F 11/3668 (2013.01); G06F 11/3692 (2013.01)

(58) Field of Classification Search
CPC .................................................. G06F 11/3612
USPC .......................................................... 717/128
See application file for complete search history.

(56) References Cited

U.S. PATENT DOCUMENTS

| 6,477,483 | B1 * | 11/2002 | Scarlat | G06F 11/3414 702/186 |
| 6,775,644 | B2 * | 8/2004 | Myers | G06F 11/3414 702/186 |
| 7,028,223 | B1 * | 4/2006 | Kolawa | G06F 11/3688 714/37 |
| 7,174,542 | B2 * | 2/2007 | Wang | G06F 11/3672 714/E11.208 |
| 7,328,134 | B1 * | 2/2008 | Burbidge, III | G06F 11/3414 702/186 |
| 7,596,778 | B2 * | 9/2009 | Kolawa | G06F 11/3688 714/38.14 |
| 8,448,148 | B1 * | 5/2013 | Kolawa | G06F 11/3688 703/23 |
| 8,510,716 | B1 * | 8/2013 | Jakubiak | G06F 11/3672 714/45 |
| 8,626,827 | B1 * | 1/2014 | Cabrera | H04L 41/5045 370/242 |
| 8,694,626 | B2 * | 4/2014 | Dugatkin | H04L 41/00 709/224 |
| 8,762,514 | B2 * | 6/2014 | Iijima | G06F 11/3414 709/224 |
| 8,892,953 | B2 * | 11/2014 | Frohlich | G06F 11/3688 714/25 |
| 8,898,639 | B2 * | 11/2014 | Lawrance | G06F 11/3684 717/124 |
| 8,959,485 | B2 * | 2/2015 | Kvartskhava | G06F 21/53 717/124 |
| 9,436,579 | B2 * | 9/2016 | Broda | G06F 11/3409 |

(Continued)

Primary Examiner — Lewis A Bullock, Jr.
Assistant Examiner — Theodore E Hebert
(74) Attorney, Agent, or Firm — Robert C. Kowert; Meyertons, Hood, Kivlin, Kowert & Goetzel, P.C.

(57) ABSTRACT

Methods, systems, and computer-readable media for load testing with automated service dependency discovery are disclosed. A request is received to approve load testing for a service. One or more downstream services are identified for the service. The one or more downstream services are identified based at least in part using automated discovery. The availability of the one or more downstream services for load testing is determined. The request is approved or denied based at least in part on the availability of the one or more downstream services for load testing.

18 Claims, 15 Drawing Sheets

(56) References Cited

U.S. PATENT DOCUMENTS

| | | | |
|---|---|---|---|
| 2002/0133807 A1* | 9/2002 | Sluiman | G06F 11/3684 717/124 |
| 2003/0196189 A1* | 10/2003 | Wang | G06F 11/3672 717/124 |
| 2004/0039550 A1* | 2/2004 | Myers | G06F 11/3414 702/186 |
| 2009/0183143 A1* | 7/2009 | Li | G06F 11/3414 717/126 |
| 2010/0153529 A1* | 6/2010 | Moser | H04L 12/2697 709/223 |
| 2010/0333072 A1* | 12/2010 | Dulip | G06F 11/3419 717/128 |
| 2013/0139073 A1* | 5/2013 | Crames | G06F 9/44505 715/760 |

* cited by examiner

LOAD TESTING WITH AUTOMATED SERVICE DEPENDENCY DISCOVERY

BACKGROUND

Large-scale computing systems, such as those associated with network-based production services, have become widely available in recent years. Examples of such systems include online merchants, internet service providers, online businesses such as photo processing services, corporate networks, cloud computing services, web-based hosting services, etc. These entities may maintain large numbers of computing devices (e.g., thousands of hosts) which are hosted in geographically separate locations and which are configured to process large quantities (e.g., millions) of client requests daily or even hourly. Complex systems may include many services that interact with one another in varied ways.

For example, web servers backed by distributed systems may provide marketplaces that offer goods and/or services for sale to consumers. For instance, consumers may visit a merchant's website to view and/or purchase goods and services offered for sale by the merchant (and/or third party merchants). Some network-based marketplaces (e.g., Internet-based marketplaces) include large electronic catalogues of items offered for sale. For each item offered for sale, such electronic catalogues typically include at least one product detail page (e.g., a web page) that specifies various information about the item, such as a description of the item, one or more pictures of the item, as well as specifications (e.g., weight, dimensions, capabilities) of the item. In various cases, such network-based marketplaces may rely on a service-oriented architecture to implement various business processes and other tasks. The service-oriented architecture may be implemented using a distributed system that includes many different computing resources and many different services that interact with one another, e.g., to produce a product detail page for consumption by a client of a web server.

Automated testing of such services is an increasingly important part of the software development process. At various stages in the development cycle, a suite of tests may be run to verify the expected operation of the software. The suite of tests may include, for example, load tests to verify that the software can perform as expected with a particular amount of throughput. In a service-oriented system that implements a service-oriented architecture, a service being tested may interact with numerous other services. Accordingly, a load test applied to one service may have a significant impact on other services as well.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods, systems, and computer-readable media for load testing with automated service dependency discovery are described. Using the techniques described herein, service dependencies for a particular service may be automatically discovered prior to load testing the particular service. For example, a call trace functionality may be used to generate trace data for a limited set of test interactions with the particular service; the trace data may be used to identify downstream services for the particular service. Once the downstream services have been identified, a global load test registry may be used to determine whether the particular service and the downstream services are available for load testing. If all the services are available, then the load testing may be initiated. If all the services are not currently available but are anticipated to be available at a future point in time, then the load testing may be scheduled to begin on or after the future point in time. Additionally, a whitelist of approved services may be used to approve or deny requests for load testing. In this manner, load tests for services may be implemented using a safety mechanism to prevent unwanted impacts on downstream services.

Figure 1:
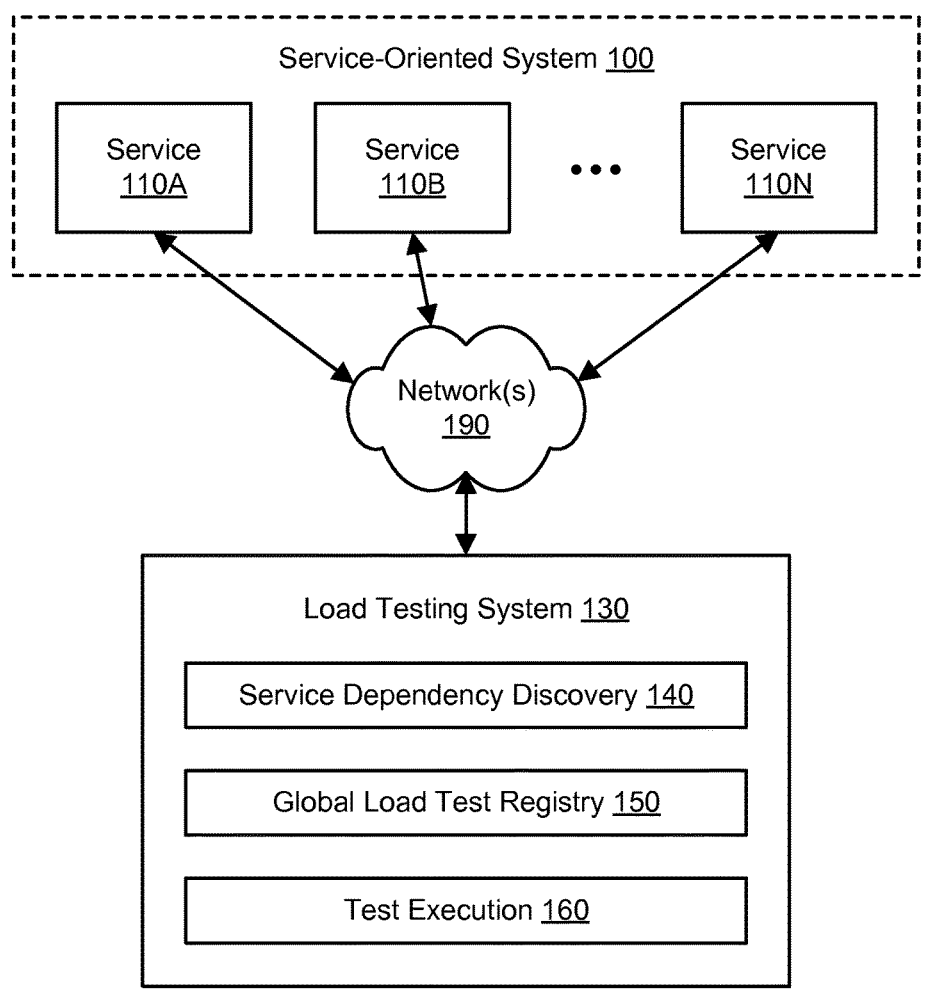
FIG. 1 illustrates an example system environment for load testing with automated service dependency discovery, according to one embodiment.

FIG. 1 illustrates an example system environment for load testing with automated service dependency discovery, according to one embodiment. The example system environment may comprise a service-oriented system 100 and a load testing system 130 that implements load testing for services in the service-oriented system. The service-oriented system 100 may implement a service-oriented architecture and may include multiple services 110A-110N configured to communicate with each other (e.g., through message passing) to carry out various tasks, such as business functions. Although three services 110A, 110B, and 110N are illustrated for purposes of example, it is contemplated that any suitable number of services may be used with the service-oriented system 100. Any of the services 110A-110N may represent different services (e.g., different sets of program code) or different instances of the same service. The services 110A-110N may be implemented using a plurality of hosts, any of which may be implemented by the example computing device 3000 illustrated in FIG. 16. The hosts may be located in any suitable number of data centers or geographical locations. In one embodiment, multiple services and/or instances of the same service may be implemented using the same host. It is contemplated that the service-oriented system 100 and/or load testing system 130 may include additional components not shown, fewer components than shown, or different combinations, configurations, or quantities of the components shown.

Each of the services 110A-110N may be configured to perform one or more functions upon receiving a suitable request. For example, a service may be configured to retrieve input data from one or more storage locations and/or from a service request, transform or otherwise process the data, and generate output data. In some cases, a first service may call a second service, the second service may call a third service to satisfy the request from the first service, and so on. For example, to build a web page dynamically, numerous services may be invoked in a hierarchical manner to build various components of the web page. In some embodiments, services may be loosely coupled in order to minimize (or in some cases eliminate) interdependencies among services. This modularity may enable services to be reused in order to build various applications through a process referred to as orchestration. A service may include one or more components that may also participate in the service-oriented system, e.g., by passing messages to other services or to other components within the same service.

The service-oriented system 100 may be configured to process requests from various internal or external systems, such as client computer systems or computer systems consuming networked-based services (e.g., web services). For instance, an end-user operating a web browser on a client computer system may submit a request for data (e.g., data associated with a product detail page, a shopping cart application, a checkout process, search queries, etc.). In another example, a computer system may submit a request for a web service (e.g., a data storage service, a data query, etc.). In general, services may be configured to perform any of a variety of business processes.

The services 110A-110N described herein may include but are not limited to one or more of network-based services (e.g., a web service), applications, functions, objects, methods (e.g., objected-oriented methods), subroutines, or any other set of computer-executable instructions. In various embodiments, such services may communicate through any of a variety of communication protocols, including but not limited to the Simple Object Access Protocol (SOAP). In various embodiments, messages passed between services may include but are not limited to Extensible Markup Language (XML) messages or messages of any other markup language or format. In various embodiments, descriptions of operations offered by one or more of the services may include Web Service Description Language (WSDL) documents, which may in some cases be provided by a service broker accessible to the services and components. References to services herein may include components within services.

The load testing system 130 may include various components, modules, or functionalities such as a service dependency discovery functionality 140, a global load test registry 150, and a test execution functionality 160. The service dependency discovery functionality 140, global load test registry 150, and test execution functionality 160 may collectively be used by the load testing system 130 to perform load testing of services using a safety mechanism to prevent unwanted impacts on downstream services. The load testing system 130 may be used to test one or more services at build time, deployment time, or any other suitable time in the development cycle. The load testing system 130 and its components may be part of a testing framework that is available to developers of services. In one embodiment, the load testing system 130 may be activated as part of a deployment pipeline for deploying a software product to a production environment.

Figure 16:
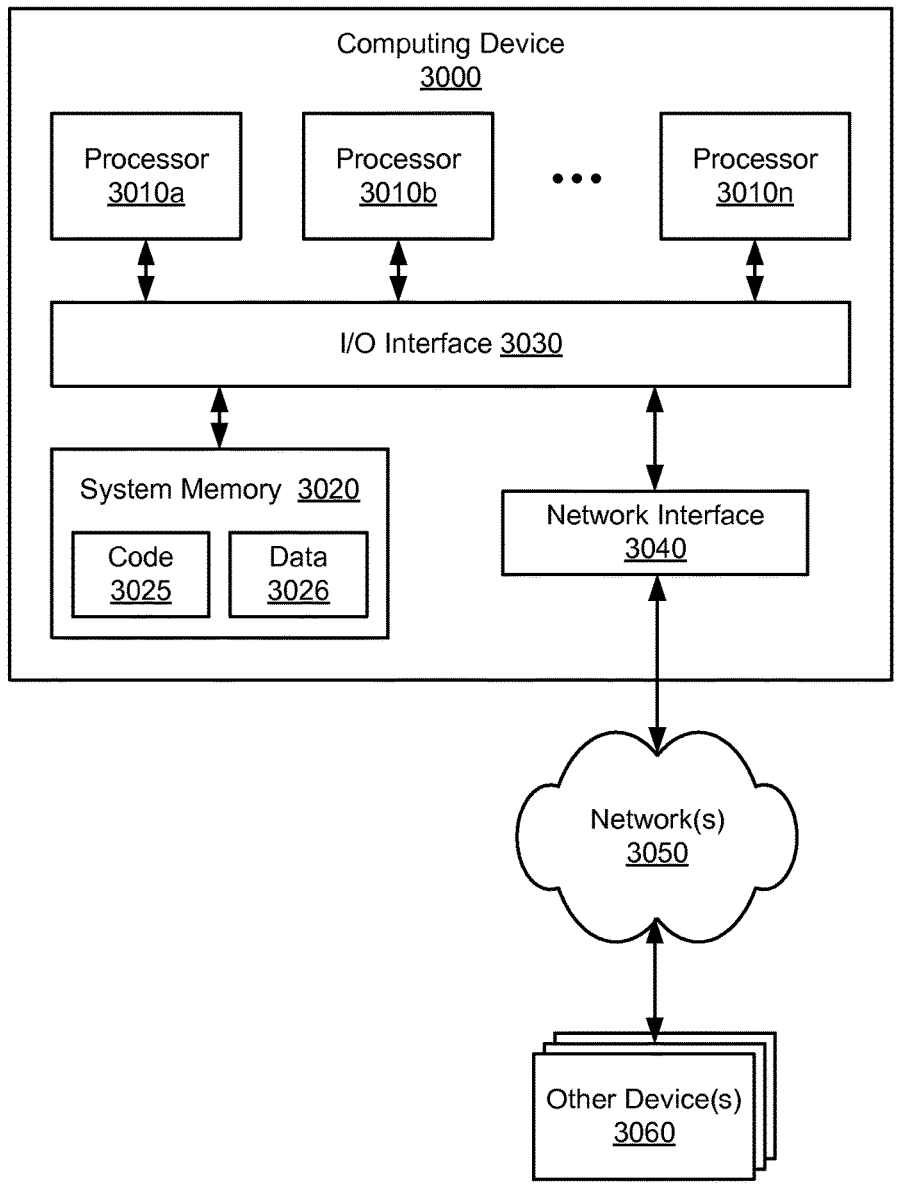
FIG. 16 illustrates an example computing device that may be used in some embodiments.

The load testing system 130 may comprise one or more computing devices, any of which may be implemented by the example computing device 3000 illustrated in FIG. 16. In various embodiments, the functionality of the different modules (e.g., service dependency discovery functionality 140, global load test registry 150, and test execution functionality 160) of the load testing system 130 may be provided by the same computing device or by different computing devices. If any of the service dependency discovery functionality 140, global load test registry 150, and/or test execution functionality 160 are implemented using different computing devices, then the modules and their respective computing devices may be communicatively coupled, e.g., via network(s) 190. Each of the service dependency discovery functionality 140, global load test registry 150, and test execution functionality 160 may represent any combination of software and hardware usable to perform their respective functions, as discussed as follows. Operations implemented by the service dependency discovery functionality 140, global load test registry 150, and test execution functionality 160 may be performed automatically, e.g., without a need for user initiation or user intervention after an initial configuration stage, and programmatically, e.g., by execution of program instructions on a computing device.

As discussed above, various combinations of the services 110A-110N may interact with one another in various service call hierarchies or other configurations. For example, in processing a request, service 110A may send another request to service 110B, and service 110B may then send yet another request to service 110N. Service 110N may send a response to service 110B, and service 110B may send a response to service 110A. Service 110A may then complete the processing of the initial request and send an appropriate response to the requesting entity. In this example, services 110B and 110N are downstream services with respect to service 110A, and service 110A is an upstream service with respect to services 110B and 110N. The service dependency discovery functionality 140 may use automated techniques to discover and/or identify such dependencies among the services 110A-110N. In one embodiment, before a particular service is subjected to load testing, the service dependency discovery functionality 140 may automatically identify any downstream services for the particular service. As will be discussed in greater detail below, the load testing system 130 may automatically send test calls to a particular service in order to identify the downstream services invoked in the processing of the test calls. Service interaction monitoring at individual services may be used to build a call graph or otherwise identify the service dependencies encountered in processing the test calls. In one embodiment, the service dependency discovery functionality 140 may automatically identify any downstream services for the particular service using static analysis of program code for the relevant services, e.g., by analyzing elements of the program code that invoke downstream services.

In one embodiment, predetermined dependency information may be used to supplement, augment, or verify the dependency information obtained using automated techniques, e.g., using interaction monitoring for the test calls. For example, the set of downstream services as determined using the automated techniques may be automatically cross-referenced with a list of known downstream services. Services on the list but not identified with automated techniques may be added to the set of downstream services.

Prior to load testing a particular service, the load testing system 130 may determine whether the particular service and its dependencies (e.g., downstream services) are available for load testing. In one embodiment, the global load test registry 150 may maintain a load testing status or other indicator of availability for individual ones of the services 110A-110N. The load testing system 130 may refer to the global load test registry 150 before approving load testing for a particular service. In one embodiment, load testing for a particular service may be approved only if the service and all of its dependencies (e.g., downstream services) are available for load testing, as indicated in the global load test registry 150.

When load testing is approved, the test execution functionality 160 may implement, execute, or otherwise perform load testing for one or more of the services 110A-110N. In one embodiment, the tests may be executed on a single system such a developer computer system or a suitable test host. In one embodiment, the tests may be executed on a set of computer systems such as a fleet of test hosts. In one embodiment, the tests may be executed in a test environment in which the software product (e.g., service) may be insulated from real-time interaction with real-world clients, e.g., by processing only synthetic requests or prerecorded client requests that were previously captured in a production environment. For example, if the software product implements a service that is associated with an electronic commerce (e-commerce) merchant, then the service may be configured to perform one or more suitable operations such as generating a web page (e.g., a product description page for a product offered for sale by the merchant), completing a sale or other transaction between the merchant and a customer, verifying a payment presented by the customer, etc.

In one embodiment, the test execution functionality 160 or another component of the load testing system 130 may determine the results of the load testing. In determining the results, the load testing system 130 may ascertain the number of successful transactions processed by the service under test over a period of time along with any other suitable throughput metrics. Analysis of responses from the service under test may be used to determine the results of the load testing. Instrumentation of the service under test, including the use of an interaction monitoring functionality and/or a functionality to determine performance metrics on one or more service hosts, may also be used to determine the results of the load testing. For example, the performance metrics may relate to aspects of processor usage, memory usage, disk or storage usage, network usage, and/or the usage of any other measurable resource. A load test may be associated with an acceptable range of results, and results outside the acceptable range may constitute a failure for that particular test. In one embodiment, the test execution functionality 160 may report the results of the load testing to one or more suitable entities, such as an owner of the service under test.

In one embodiment, various heuristics may be applied to determine whether the service passes or fails a particular test. The heuristics may also include default heuristics, where appropriate. In one embodiment, a user may specify the percentile metrics to consider for the heuristics (e.g., minimum, maximum, average, p50, p90, p99, etc.). In one embodiment, a user may specify which transactions to consider for the heuristics: e.g., all transactions averaged, any transaction type (e.g., fail if the p90 of any transaction type has increased by 10%), or a specific transaction type (e.g., fail if the p90 of reads has increased). In one embodiment, the heuristics may implement service level agreements (SLAs) for the service. For example, the performance metrics collected for the tests may indicate the number of transactions processed and the pass/fail ratio. A heuristic may fail the build if the error rate exceeds a predetermined threshold (e.g., 0.1% error rate). Such a heuristic may be applied to one or more specific transaction types or to all transaction types.

Figure 2:
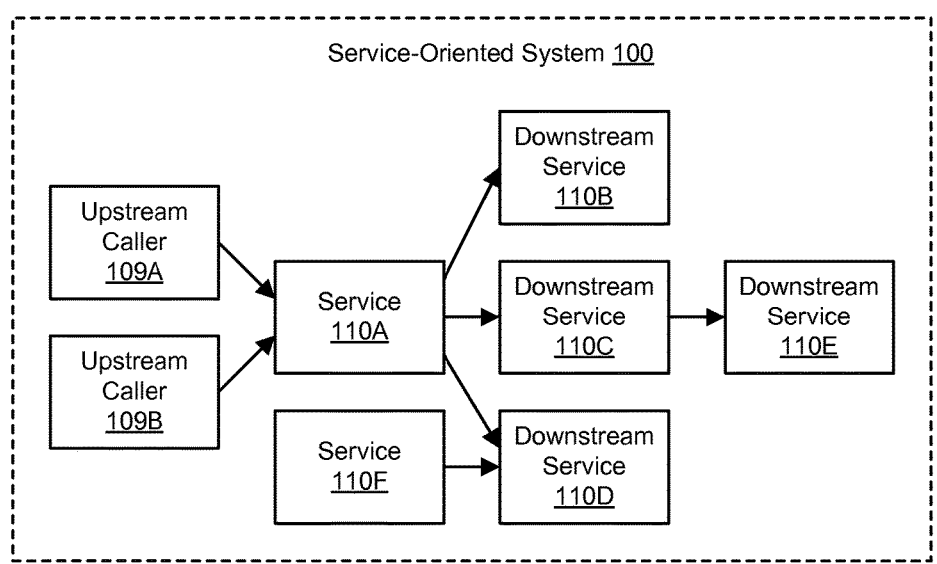
FIG. 2 illustrates an example configuration of services usable in load testing with automated service dependency discovery, according to one embodiment.

FIG. 2 illustrates an example configuration of services usable in load testing with automated service dependency discovery, according to one embodiment. The configuration of services shown in FIG. 2 is presented for purposes of example and illustration, and it is contemplated that the techniques described herein may be implemented with other suitable configurations of services. As shown in the example, one or more upstream callers 109A and 109B may send service requests to a particular service 110A. The upstream callers 109A and 109B may represent other services in the service-oriented system 100 or other types of entities. In processing the requests from the upstream callers 109A and 109B, the service 110A may send service requests to various downstream services such as services 110B, 110C, and 110D. As shown in the example, the downstream service 110C may also send a service request to a further downstream service 110E in the processing of the request from the service 110A. Additionally, yet another service 110F may send one or more service requests to one of the same downstream services 110D. Each upstream service or entity may increase the load on its downstream dependencies. Accordingly, the upstream callers 109A and 109B may increase the load on the service 110A; the service 110A may increase the load on the downstream services 110B, 110C, 110D, and 110E; and the service 110F may also increase the load on the downstream service 110D.

In such a configuration, concurrent load testing of multiple services may skew the results in comparison to load testing of a single service over a particular period of time. For example, if services 110A and 110F are load tested concurrently, then the mutual dependency represented by the downstream service 110D may suffer negative impacts from the load placed upon it by both services. In such a scenario, the downstream service 110D may return a higher percentage of errors, process requests more slowly, crash, or suffer other availability issues. In general, the downstream services 110B, 110C, 110D, and 110E may not be prepared for the increased load caused by load testing on the service 110A. Because service 110A and further downstream service 110E (or their owners) may not be aware of their dependency relationship, load testing for service 110A is even more likely to place unexpected load on the service 110E. Using the techniques described herein, the load testing system 130 may eliminate or mitigate the negative impacts of concurrent load testing of multiple services.

Figure 3:
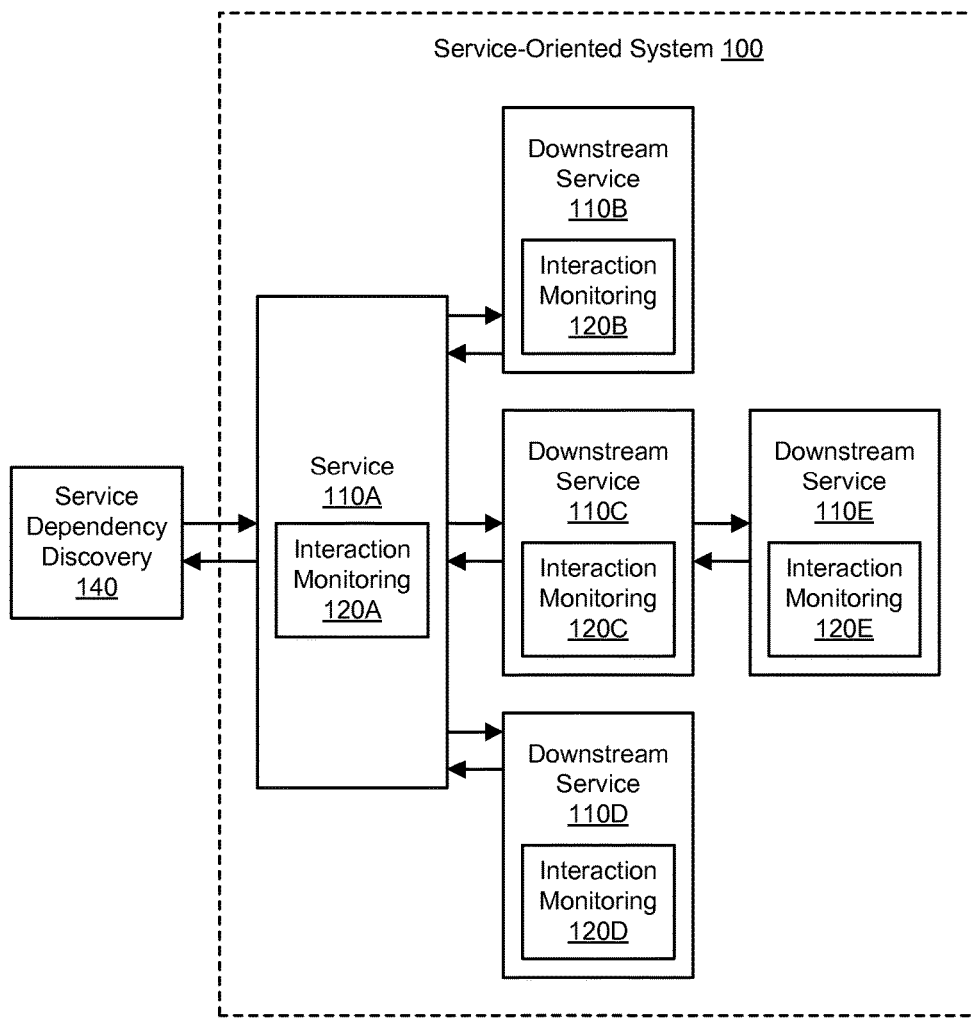
FIG. 3 illustrates automated service dependency discovery using interaction monitoring at individual services, according to one embodiment.

FIG. 3 illustrates automated service dependency discovery using interaction monitoring at individual services, according to one embodiment. The configuration of services shown in FIG. 3 is presented for purposes of example and illustration, and it is contemplated that the techniques described herein may be implemented with other suitable configurations of services. As discussed above, the service dependency discovery functionality 140 may use automated techniques to discover and/or identify dependencies among the services. In one embodiment, before a particular service 110A is subjected to load testing, the service dependency discovery functionality 140 may identify any downstream services for the particular service 110A. In one embodiment, the service dependency discovery functionality 140 may send test calls (e.g., service requests) to the particular service 110A in order to identify the downstream services invoked in the processing of the test calls. In processing the test calls, the service 110A may send additional service requests to downstream services 110B, 110C, and 110D. The downstream service 110C may send yet more service requests to the further downstream service 110E. After processing a request, the downstream service 110E may send a response to the downstream service 110C. Similarly, the downstream services 110B, 110C, and 110D may send responses to the service 110A. Finally, the service 110A may send a response to the service dependency discovery functionality 140 for each test call (e.g., service request).

In one embodiment, service interaction monitoring at individual services 110A, 110B, 110C, 110D, and 110E may be used to identify the service dependencies associated with the test calls. In one embodiment, each of the services 110A-110E may be configured with one or more components for monitoring interactions between services. For example, service 110A may include an interaction monitoring functionality 120A, service 110B may include an interaction monitoring functionality 120B, service 110C may include an interaction monitoring functionality 120C, service 110D may include an interaction monitoring functionality 120D, and service 110E may include an interaction monitoring functionality 120E. The interaction monitoring functionality may also be referred to herein as a call trace functionality. The interaction monitoring functionality 120A, 120B, 120C, 120D, or 120E may monitor or track interactions between the corresponding service 110A, 110B, 110C, 110D, or 110E and other services (or components of services) in the service-oriented system 100. The monitored interactions may include service requests (i.e., requests for services to be performed), responses to requests, and other suitable events.

To monitor the service interactions, lightweight instrumentation may be added to services, including services 110A, 110B, 110C, 110D, and 110E. The instrumentation (e.g., a reporting agent associated with each service) may collect and report data associated with each inbound request, outbound request, or other service interaction (e.g., a timer-based interaction) processed by a service. Further aspects of the interaction monitoring functionality 120A-120E are discussed below with respect to FIG. 10 through FIG. 15.

Based on the interaction monitoring, the services 110A-110E may generate and/or collect trace data. The trace data may describe aspects of the service interactions. In one embodiment, the trace data may be generated in real-time or near real-time, e.g., as service requests and service responses are received and/or processed by the services. The trace data may include call path data or other data indicative of relationships between individual services, such as an identification of the calling (i.e., requesting) service and the called (i.e., requested) service for each interaction. The trace data may include metadata such as request identifiers that are usable to identify paths of service requests and responses from service to service. Request identifiers, also referred to herein as trace identifiers, are discussed in greater detail below with respect to FIG. 10 through FIG. 15. The trace data may also include data describing the performance of the service interactions. For example, the trace data may include data indicative of network latency for a request or response, data indicative of network throughput for one or more interactions, data indicative of service reliability or availability, data indicative of resource usage, etc.

The interaction monitoring functionality 120A-120E for the various services may collect data indicative of service interactions involved in satisfying a particular initial request, e.g., data indicative of a route taken in satisfying a service request and/or a hierarchy of call pathways between services. The route may correspond to a set of call paths between services. The call paths may represent inbound service requests and outbound service requests relative to a particular service. To process a given received request, one or more services may be invoked. As used herein, an initial request may be referred to as the "root request." In various embodiments, the root request may but need not originate from a computer system outside of the service-oriented system 100. In many embodiments, a root request may be processed by an initial service, which may then call one or more other services. Additionally, each of those services may also call one or more other services, and so on until the root request is completely fulfilled. The particular services called to fulfill a request may be represented as a call graph that specifies a hierarchy of services as a directed graph, where nodes represent services and edges represent service interactions.

In one embodiment, the interaction monitoring functionality 120A-120E of the various services 110A-110E may be configured to monitor all or substantially all of the service interactions. In one embodiment, the interaction monitoring functionality 120A-120E of the various services 110A-110E may be configured to generate trace data on an interaction-by-interaction basis. For example, the interaction monitoring and resulting generation of trace data may be enabled only for service interactions whose request identifier includes particular metadata.

In one embodiment, the trace data generated in processing the test calls may be sent or otherwise made available to the service dependency discovery functionality 140. Using the trace data, the service dependency discovery functionality 140 may identify any downstream services invoked in the processing of the test calls. For the example configuration shown in FIG. 3, the service dependency discovery functionality 140 may identify services 110B, 110C, 110D, and 110E as downstream services with respect to service 110A.

Figure 4:
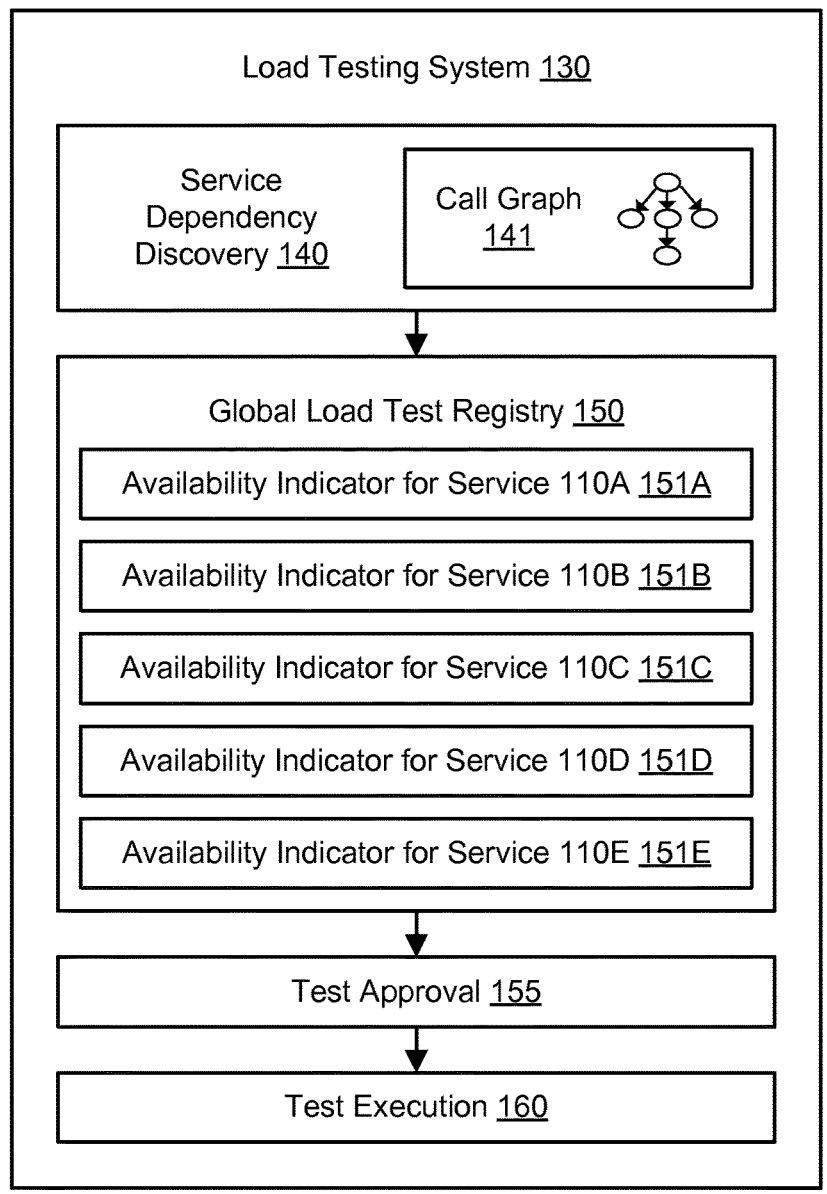
FIG. 4 illustrates a global load test registry for load testing with automated service dependency discovery, according to one embodiment.

FIG. 4 illustrates a global load test registry for load testing with automated service dependency discovery, according to one embodiment. Using the service dependency discovery functionality 140, the load testing system 130 may analyze the trace data and generate one or more call graphs 141 based on connectivity information within the trace data. Each call graph 141 may represent the flow of requests from service to service and may identify service dependencies. Each call graph 141 may include a hierarchical data structure with a plurality of nodes representing services and one or more edges (also referred to as call paths) representing service interactions. In some cases, a call graph may be a deep and broad tree with multiple branches each representing a series of related service calls. The service dependency discovery functionality 140 may use any suitable data and metadata to build each call graph 141, such as request identifiers and metadata associated with services and their interactions. The request identifiers and metadata are discussed below with respect to FIG. 10 through FIG. 15.

Accordingly, the call graph 141 may represent the dependency relationships between a particular service 110A and the downstream services 110B, 110C, 110D, and 110E that are invoked directly or indirectly by that particular service. Prior to approving or performing load testing for the service 110A, the load testing system 130 may verify the availability for load testing of the service 110A and the downstream services 110B, 110C, 110D, and 110E. The global load test registry 150 may include, for each multiple services, availability indicators for those services. As shown in the example of FIG. 4, the global load test registry 150 may include an availability indicator 151A for service 110A, an availability indicator 151B for service 110B, an availability indicator 151C for service 110C, an availability indicator 151D for service 110D, and an availability indicator 151E for service 110E. Each of the availability indicators 151A-151E may use suitable metadata to indicate whether the corresponding service 110A-110E is available for load testing. In one embodiment, each of the availability indicators 151A-151E may indicate whether the corresponding service 110A-110E is "locked" or "unlocked" for load testing, e.g., whether or not the corresponding service is being used in load tests at the present time. A "locked" status may indicate that the service is unavailable for load testing, and an "unlocked" status may indicate that the service is available for load testing. In one embodiment, one or more of the availability indicators 151A-151E may also include additional metadata, such as a time component that represents a window of time for which the corresponding service is locked.

A test approval functionality 155 of the load testing system 130 may refer to the global load test registry 150 to determine whether to approve or deny a request to perform load testing for a particular service. In one embodiment, load testing may be approved if and only if the particular service and all of its dependencies are available for load testing. In one embodiment, load testing may be denied if the particular service or any of its dependencies are unavailable for load testing, e.g., marked as "locked" in the global load test registry 150. In one embodiment, approval may be postponed while one or more of the relevant services are indicated as unavailable in the global load test registry 150. In one embodiment, if one or more of the relevant services are indicated as unavailable in the global load test registry 150, load testing may be approved but scheduled to begin on or after a future point in time.

Figure 5:
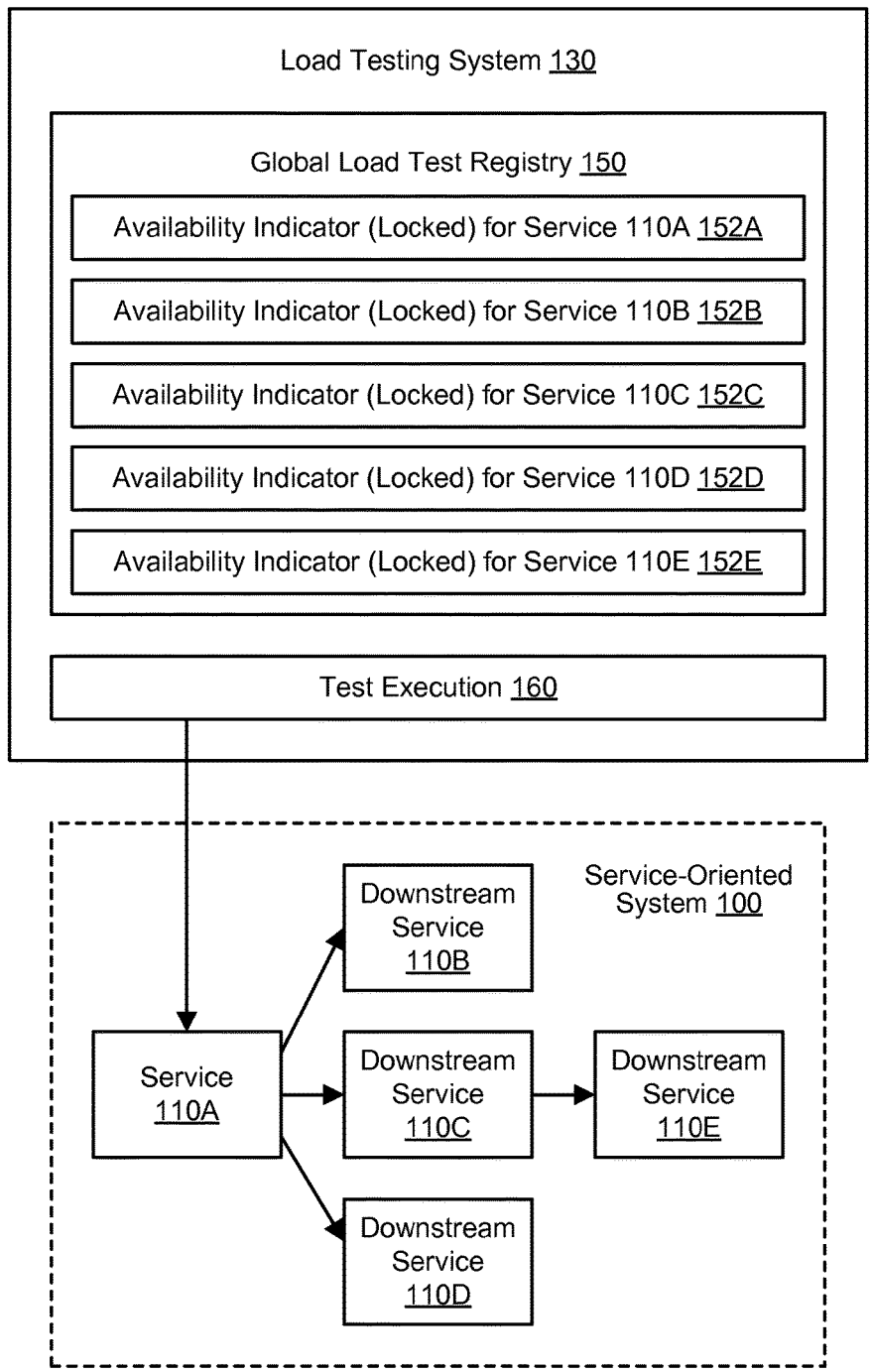
FIG. 5 illustrates the locking of services in a global load test registry during load testing, according to one embodiment.

FIG. 5 illustrates the locking of services in a global load test registry during load testing, according to one embodiment. After load testing is approved for a particular service 110A, the test execution functionality 160 may begin the load testing, e.g., by applying load to the service 110A and determining the results. In one embodiment, an availability indicator may be set to "locked" while load testing is being performed for the corresponding service or for an upstream service of the corresponding service. While the service 110A is being load tested, an availability indicator 152A for the service may be marked as "locked" in the global load test registry 150. Similarly, for each of the downstream services 110B, 110C, 110D, and 110E, the respective availability indicator 152B, 152C, 152D, and 152E for the corresponding service may also be marked as "locked" in the global load test registry 150. In one embodiments, all of the services 110A, 110B, 110C, 110D, and 110E may be marked as "locked" in response to approval of the request for load testing for the service 110A. The availability indicators may be set to "unlocked" after the load testing has been completed. In this manner, particular services may be reserved for exclusive use in load testing for a duration of time.

Figure 6:
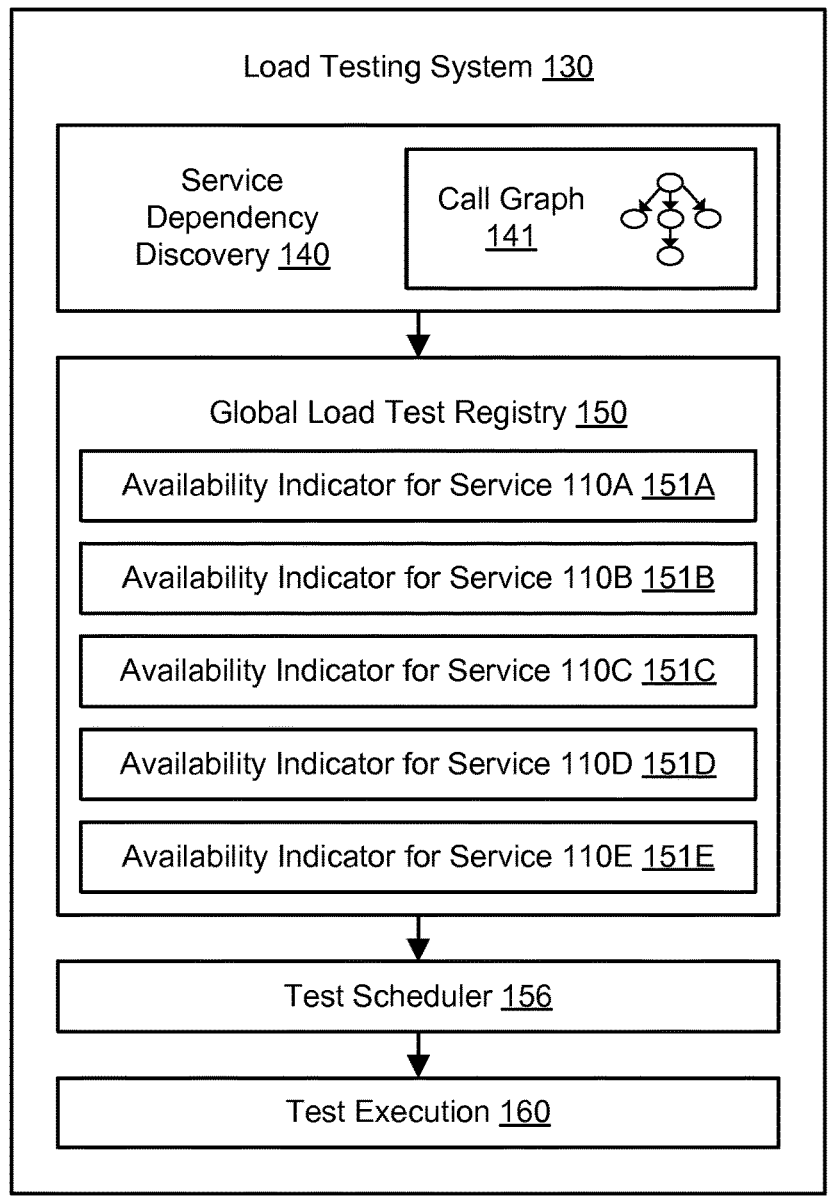
FIG. 6 illustrates a test scheduler that interfaces with a global load test registry for load testing with automated service dependency discovery, according to one embodiment.

FIG. 6 illustrates a test scheduler that interfaces with a global load test registry for load testing with automated service dependency discovery, according to one embodiment. In one embodiment, if one or more of the relevant services are indicated as unavailable in the global load test registry 150, load testing may be approved but scheduled to begin on or after a future point in time. Accordingly, a test scheduler 156 may determine a point in time at which the load testing for a particular service may proceed. Any suitable scheduling techniques may be used to implement the test scheduler 156. In one embodiment, the test scheduler 156 may assign a window of time to a load test. The load testing may begin at any suitable point within the window of time. In one embodiment, the entity requesting the load testing may specify a desired window of time or start time for the load testing, and the test scheduler 156 may attempt to honor the requested time. In one embodiment, requests for load testing may have different priority levels, and the test scheduler 156 may implement a scheduling algorithm that takes the priorities into account. In one embodiment, requests for load testing may be queued by the test scheduler 156, and requests later in the queue may be approved when all of the relevant services are unlocked.

Figure 7:
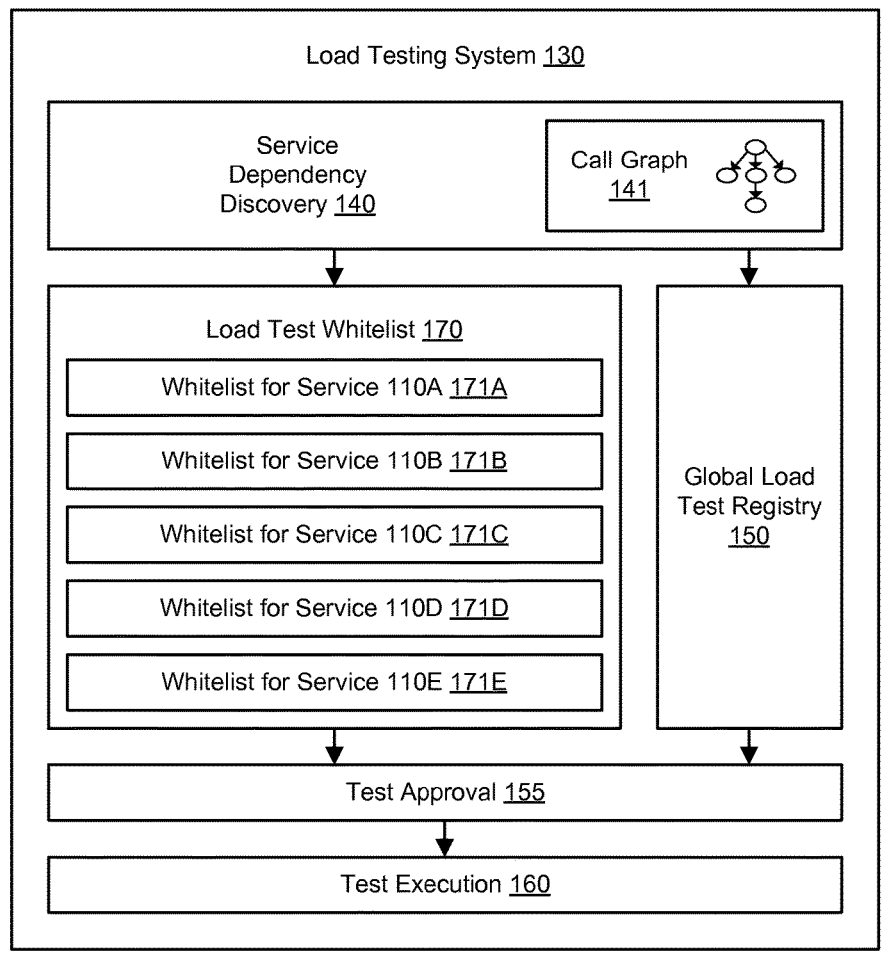
FIG. 7 illustrates a load test whitelist for load testing with automated service dependency discovery, according to one embodiment.

FIG. 7 illustrates a load test whitelist for load testing with automated service dependency discovery, according to one embodiment. Prior to approving or performing load testing for a particular service 110A, the load testing system 130 may verify the availability for load testing of the service 110A and the downstream services 110B, 110C, 110D, and 110E. As discussed above, the load testing system 130 may use a global load test registry 150 to maintain availability indicators for those services. In one embodiment, the load testing system 130 may also use a load test whitelist 170 to indicate the availability for those services. The global load test registry 150 and whitelist 170 may be jointly used to determine whether to approve load testing for a particular service 110A having a set of downstream services 110B-110E. For example, the whitelist 170 may indicate explicit authorization for load testing of particular downstream services with particular upstream services, while the global load test registry 150 may indicate whether services are currently unavailable for load testing with all other services.

As shown in the example of FIG. 7, the load test whitelist 170 may include a whitelist 171A for service 110A, a whitelist 171B for service 110B, a whitelist 171C for service 110C, a whitelist 171D for service 110D, and a whitelist 171E for service 110E. Each of the whitelists 171A-171E may use suitable metadata to indicate whether the corresponding service 110A-110E approves its use in load testing for one or more other services. For example, the whitelist 171B for downstream service 110B may specifically name (or otherwise indicate) service 110A among a list of one or more services which are explicitly authorized to apply load to the downstream service 110B in a load test. Similarly, each of the whitelists 171C-171E may also name (or otherwise indicate) service 110A as an authorized service for load testing. In one embodiment, load testing for an upstream service may be approved only if it is included in the whitelists for all of its relevant downstream services. In one embodiment, not every service may participate in the load test whitelist 170, and such services may not require approval to be used in load testing for other services.

As shown in FIG. 3, service 110A may call service 110C which may then call service 110E. In one embodiment, load testing for service 110A may be approved if the whitelist 171E for service 110E explicitly authorizes load testing for service 110A. In one embodiment, load testing for service 110A may be approved if the whitelist 171E for service 110E explicitly authorizes load testing for service 110C. In one embodiment, load testing for service 110A may be approved if the whitelist 171E for service 110E explicitly authorizes load testing for both service 110A and service 110C.

In one embodiment, the test approval functionality 155 may refer to both the load test whitelist 170 and the global load test registry 150 to determine whether to approve or deny a request to perform load testing for a particular service. In one embodiment, load testing may be approved if and only if the particular service and all of its dependencies are available for load testing, and also if all of the downstream services (that participate in the whitelist 170) approve their use in load testing for the particular service. In one embodiment, if a particular service 110A is not included in the whitelist for one of its downstream services, the load testing system 130 may recommend to an owner of the service 110A to obtain inclusion in that whitelist. In one embodiment, if a particular service 110A is not included in the whitelist for one of its downstream services, the load testing system 130 may automatically attempt to obtain inclusion in that whitelist for the service 110A, e.g., by sending an appropriate message to the owner of the downstream service. If inclusion in the whitelist is obtained, then the test approval functionality 155 may approve the load testing for the service 110A.

In one embodiment, whitelisting may be based on elements other than the identities of authorized services. For example, the whitelist for a service may indicate that the service may be used in load testing only during authorized hours, e.g., specifically indicated non-peak hours or weekends. Approval of a request for load testing may be denied if the requested load testing would be performed at a time that is not authorized in the whitelist for a service. In one embodiment, the whitelist for a service may be based on system metrics, such that a request for load testing may be approved only if one or more metrics for one or more service hosts are within authorized ranges. For example, a whitelist may authorize load testing for a service only if the CPU utilization on the host is below 50%. In general, any performance metric or combination of metrics may be used in a rule in a whitelist, including metrics related to processor usage, memory usage, storage usage, power usage, and/or network usage. In one embodiment, a service may also be locked (e.g., by its owner) for an arbitrary reason and an arbitrary length of time.

In one embodiment, services may not be locked or unlocked in a binary manner but instead available for a particular amount of load. For example, a service may specify the maximum load (e.g., in transactions per second [TPS]) that it will accept for load testing purposes. The maximum load for a service may be specified in a whitelist. Each request for load testing may indicate a throughput goal (e.g., in TPS). Each additional concurrent load test may add to the aggregate load on a service, and the load testing system 130 may keep track of the remaining capacity of a service. If the specified throughput goal of a new request would not cause a service or any of its downstream services to exceed its specified maximum load, then the new request may be approved. However, if the specified throughput goal of a new request would cause a service or any of its downstream services to exceed its specified maximum load, then the new request may be denied. Throughput may not be linear from upstream services to downstream services, e.g., if caching is used between the services. Accordingly, the load testing system 130 may keep statistics for load tests and, based on analysis of previous load tests, attempt to predict the impact of load tests with respect to specified maximums for particular downstream services. In one embodiment, a load test may be aborted if the throughput increases beyond a predicted or specified threshold for a particular duration of time.

Figure 8:
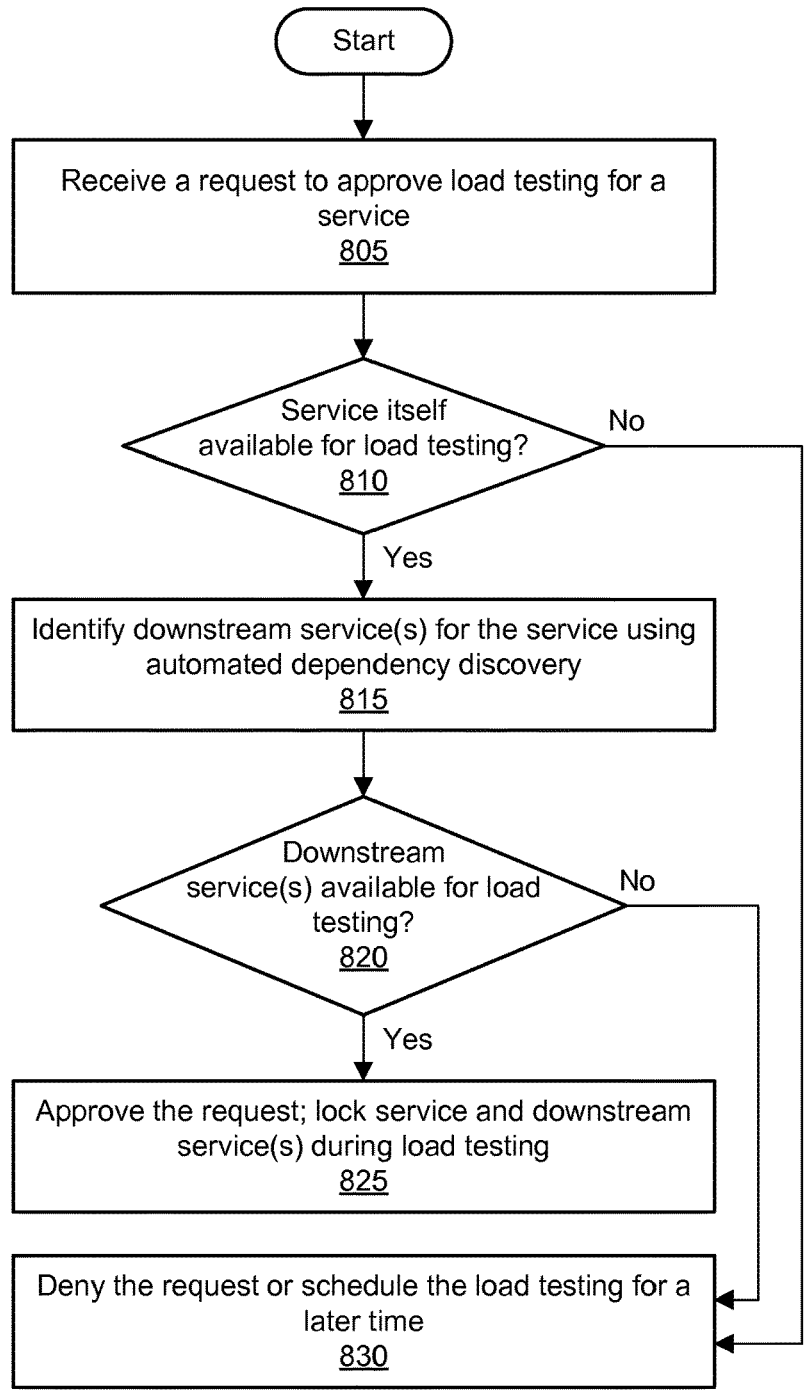
FIG. 8 is a flowchart illustrating a method for load testing with automated service dependency discovery, according to one embodiment.

FIG. 8 is a flowchart illustrating a method for load testing with automated service dependency discovery, according to one embodiment. As shown in 805, a request may be received to approve load testing for a service. The request may be received by a load testing system or load testing framework using any suitable interface(s). The request may be sent by an owner and/or developer of the service. In one embodiment, the approval may be sought as a step in a pipeline, e.g., for generating a build of a software product, deploying a software product to a test environment, or deploying a software product to a production environment.

As shown in 810, it may be determined whether the service itself is available for load testing. In one embodiment, the operation shown in 810 may refer to a global load test registry to determine whether the service is locked, e.g., during load testing of itself or during load testing of another service. If the service is available for load testing, then the method may proceed to the operation shown in 815. If the service is not available for load testing, then the method may proceed to the operation shown in 830.

As shown in 815, any downstream services for the service may be identified. In one embodiment, the downstream service(s) may be identified using techniques for automated dependency discovery. For example, a set of test calls may be sent to the service, and interaction monitoring for the service and its downstream services may be used to determine connectivity and dependency information.

As shown in 820, it may be determined whether each of the downstream services is available for load testing. In one embodiment, the operation shown in 820 may refer to a global load test registry to determine whether each downstream service is locked, e.g., during load testing of itself or during load testing of another service. If all of the downstream services are available for load testing, then the method may proceed to the operation shown in 825. If any of the downstream services is not available for load testing, then the method may proceed to the operation shown in 830.

As shown in 825, the request for load testing may be approved. In one embodiment, the service and the downstream services may be indicated as "locked" in the global load test registry upon approval of the request or after load testing is initiated. As shown in 830, the request for load testing may instead be denied or scheduled for a later time.

Figure 9:
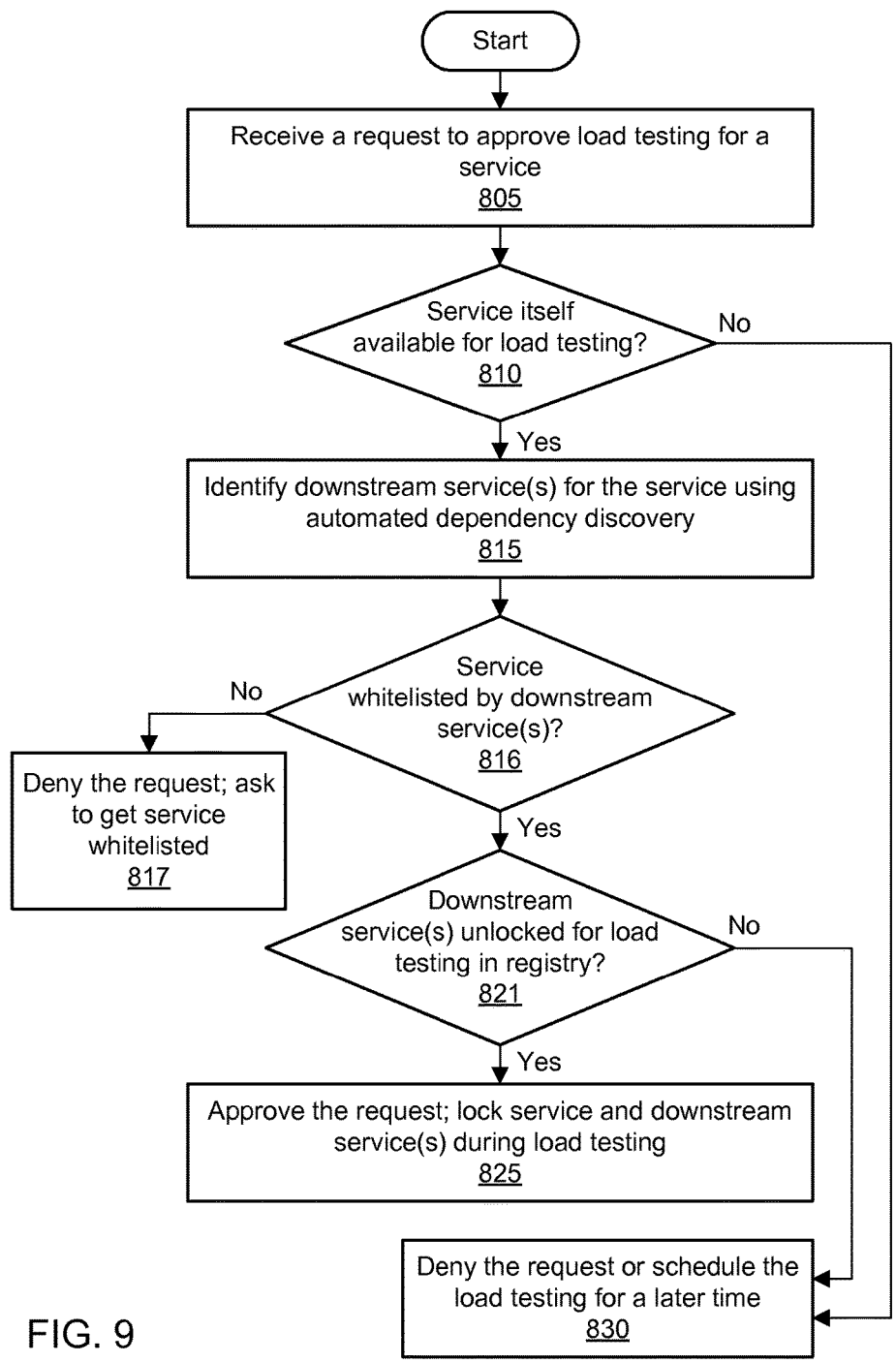
FIG. 9 is a flowchart illustrating a method for load testing with automated service dependency discovery, including service whitelisting, according to one embodiment.

FIG. 9 is a flowchart illustrating a method for load testing with automated service dependency discovery, including service whitelisting, according to one embodiment. As shown in 805, a request may be received to approve load testing for a service. The request may be received by a load testing system or load testing framework using any suitable interface(s). The request may be sent by an owner and/or developer of the service. In one embodiment, the approval may be sought as a step in a pipeline, e.g., for generating a build of a software product, deploying a software product to a test environment, or deploying a software product to a production environment.

As shown in 810, it may be determined whether the service itself is available for load testing. In one embodiment, the operation shown in 810 may refer to a global load test registry to determine whether the service is locked, e.g., during load testing of itself or during load testing of another service. If the service is available for load testing, then the method may proceed to the operation shown in 815. If the service is not available for load testing, then the method may proceed to the operation shown in 830.

As shown in 815, any downstream services for the service may be identified. In one embodiment, the downstream service(s) may be identified using techniques for automated dependency discovery. For example, a set of test calls may be sent to the service, and interaction monitoring for the service and its downstream services may be used to determine connectivity and dependency information.

As shown in 816, it may be determined whether the service is whitelisted by each of the downstream services. In one embodiment, the operation shown in 820 may refer to one or more whitelists to determine whether each downstream service specifically approves its use in load testing with the upstream service. If all of the downstream services have whitelisted the upstream service, then the method may proceed to the operation shown in 821. If any of the downstream services has not whitelisted the upstream service, then the method may proceed to the operation shown in 817.

As shown in 817, the request for load testing may be denied. In one embodiment, if a particular service is not included in the whitelist for one of its downstream services, then a recommendation may be sent to an owner of the service to obtain inclusion in that whitelist. In one embodiment, if a particular service is not included in the whitelist for one of its downstream services, then an attempt to obtain inclusion in that whitelist may be made automatically, e.g., by sending an appropriate message to the owner of the downstream service.

As shown in 821, it may be determined whether each of the downstream services is available for load testing. In one embodiment, the operation shown in 821 may refer to a global load test registry to determine whether each downstream service is locked, e.g., during load testing of itself or during load testing of another service. If all of the downstream services are available for load testing, then the method may proceed to the operation shown in 825. If any of the downstream services is not available for load testing, then the method may proceed to the operation shown in 830.

As shown in 825, the request for load testing may be approved. In one embodiment, the service and the downstream services may be indicated as "locked" in the global load test registry upon approval of the request or after load testing is initiated. As shown in 830, the request for load testing may instead be denied or scheduled for a later time.

Tracing Service Interactions

As discussed above, a call trace functionality may be used to monitor interactions between services. The resulting trace data may be used to generate a call graph or other representation of service dependencies. Examples of embodiments of the call trace functionality are discussed as follows. It is contemplated that other embodiments of a call trace functionality may be used with the systems and methods described herein for load testing with automated service dependency discovery.

For clarity of description, various terms may be useful for describing elements of a call graph. Note that the following terminology may only be applicable to services and requests of a given call graph. In other words, the following terminology may only be applicable for services and requests associated with the same root request. From the perspective of a particular service, any service that calls the particular service may be referred to as a "parent service." Furthermore, from the perspective of a particular service, any service that the particular service calls may be referred to as a "child service." In a similar fashion, from the perspective of a particular request, any request from which the particular request stems may be referred to as a "parent request." Furthermore, from the perspective of a particular request, any request stemming from the particular request may be referred to as a "child request." Additionally, as used herein the phrases "request," "call," "service request" and "service call" may be used interchangeably. Note that this terminology refers to the nature of the propagation of a particular request throughout the present system and is not intended to limit the physical configuration of the services. As may sometimes be the case with service-oriented architectures employing modularity, each service may in some embodiments be independent of other services in the service-oriented system (e.g., the source code of services or their underlying components may be configured such that inter-dependencies among source and/or machine code are not present).

As described above, a given parent request may result in multiple child service calls to other services. In various embodiments, request identifiers embedded within such service calls (or located elsewhere) may be utilized to generate a stored representation of a call graph for a given request. In various embodiments, such request identifiers may be stored in log files associated with various services. For instance, a service may store identifiers for inbound requests in an inbound request log and/or store identifiers for outbound requests in an outbound request log. In various embodiments, call graph generation logic may generate a representation of a call graph from identifiers retrieved from such logs. Such representations may be utilized for diagnosing errors with request handling, providing developer support, and performing traffic analysis.

Figure 10:
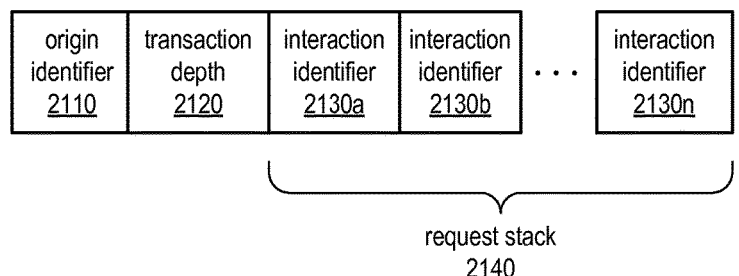
FIG. 10 illustrates an example format of a request identifier, according to some embodiments.

FIG. 10 illustrates an example format for a request identifier 2100 of various embodiments. As described in more detail below, request identifiers of the illustrated format may be passed along with service requests. For instance, a service that calls another service may embed in the call an identifier formatted according to the format illustrated by FIG. 10. For example, a requesting service may embed a request identifier within metadata of a request. In various embodiments, embedding a request identifier in a service request may include embedding within the service request, information that specifies where the request identifier is located (e.g., a pointer or memory address of a location in memory where the request identifier is stored).

The various components of the illustrated request identifier format are described in more detail below.

An origin identifier (ID) 2110 may be an identifier assigned to all requests of a given call graph, which includes the initial root request as well as subsequent requests spawned as a result of the initial root request. For example, as described above, the service-oriented systems of various embodiments may be configured to process requests from various internal or external systems, such as client computer systems or computer systems consuming networked-based services. To fulfill one of such requests, the service-oriented system may call multiple different services. For instance, service "A" may be the initial service called to fulfill a request (e.g., service "A" may be called by an external system). To fulfill the initial request, service "A" may call service "B," which may call service "C," and so on. Each of such services may perform a particular function or quantum of work in order to fulfill the initial request. In various embodiments, each of such services may be configured to embed the same origin identifier 2110 into a request of (or call to) another service. Accordingly, each of such requests may be associated with each other by virtue of containing the same origin identifier. As described in more detail below, the call graph generation logic of various embodiments may be configured to determine that request identifiers having the same origin identifier are members of the same call graph.

The manner in which the origin identifier may be represented may vary according to various embodiments and implementations. One particular example of an origin identifier may include a hexadecimal string representation of a standard Universally Unique Identifier (UUID) as defined in Request for Comments (RFC) 4122 published by the Internet Engineering Task Force (IETF). In one particular embodiment, the origin identifier may contain only lowercase alphabetic characters in order to enable fast case-sensitive comparison of request identifiers (e.g., a comparison performed by the call graph generation logic described below). Note that these particular examples are not intended to limit the implementation of the origin ID. In various embodiments, the origin ID may be generated according to other formats.

Transaction depth 2120 may indicate the depth of a current request within the call graph. For instance (as described above), service "A" may be the initial service called to fulfill a root request (e.g., service "A" may be called by an external system). To fulfill the initial request, service "A" may call service "B," which may call service "C," and so on. In various embodiments, the depth of the initial request may be set to 0. For instance, when the first service or "root" service receives the root service request, the root service (e.g., service "A") may set the transaction depth 120 to 0. If in response to this request the originating service calls one or more other services, the transaction depth for these requests may be incremented by 1. For instance, if service "A" were to call two other services "B1" and "B2," the transaction depth of the request identifiers passed to such services would be equivalent to 1. The transaction depth for request identifiers of corresponding requests sent by B1 and B2 would be incremented to 2 and so on. In the context of a call graph, the transaction depth of a particular request may in various embodiments represent the distance (e.g., number of requests) between that request and the root request. For example, the depth of the root request may be 0, the depth of a request stemming from the root request may be 1, and so on. Note that in various embodiments, such numbering system may be somewhat arbitrary and open to modification.

The manner in which the origin identifier may be represented may vary according to various embodiments and implementations. One particular example of a transaction depth may be represented as a variable-width base-64 number. In various embodiments, the value of a given transaction depth may be but need not be a value equivalent to the increment of the previous transaction depth. For instance, in some embodiments, each transaction depth may be assigned a unique identifier, which may be included in the request identifier instead of the illustrated transaction depth 2120.

Interaction identifiers 2130*a*-2130*n*, collectively referred to as interaction identifier(s) 2130, may each identify a single request (or service call) for a given call graph. For instance (as described above), service "A" may be the initial service called to fulfill a request (e.g., service "A" may be called by an external system). To fulfill the root request, service "A" may call service "B," which may call service "C," and so on. In one example, the call of service "B" by service "A" may be identified by interaction identifier 2130*a*, the call of service "C" by service "B" may be identified by interaction identifier 2130*b* and so on.

Note that in various embodiments separate service requests between the same services may have separate and unique interaction identifiers. For example, if service "A" calls service "B" three times, each of such calls may be assigned a different interaction identifier. In various embodiments, this characteristic may ensure that the associated request identifiers are also unique across service requests between the same services (since the request identifiers include the interactions identifiers).

Note that in various embodiments the interaction identifier may be but need not be globally unique (e.g., unique with respect to all other interaction identifiers). For instance, in some embodiments, a given interaction identifier for a given request need be unique only with respect to request identifiers having a particular origin identifier 2110 and/or a particular parent interaction identifier, which may be the interaction identifier of the request preceding the given request in the call graph (i.e., the interaction identifier of the request identifier of the parent service). In one example, if service "A" were to call two other services "B1" and "B2," the request identifier of service "B1" and the request identifier of service "B2" would have separate interaction identifiers. Moreover, the parent interaction identifier of each of such interaction identifiers may be the interaction identifier of the request identifier associated with the call of service "A." The relationship between interaction identifiers and parent interaction identifiers is described in more detail below.

In various embodiments, interaction identifiers may be generated randomly or pseudo-randomly. In some cases, the values generated for an interaction identifier may have a high probability of uniqueness within the context of parent interaction and/or a given transaction depth. In some embodiments, the size of the random numbers that need to be generated depends on the number of requests a service makes.

Request stack 2140 may include one or more of the interaction identifiers described above. In various embodiments, the request stack may include the interaction identifier of the request to which the request identifier belongs. In some embodiments, the request stack may also include other interaction identifiers, such as one or more parent interaction identifiers of prior requests (e.g., a "stack" or "history" of previous interaction identifiers in the call graph). In various embodiments, the request stack may have a fixed size. For instance, the request stack 2140 may store a fixed quantity of interaction identifiers including the interaction identifier of the request to which the request identifier belongs and one or more parent interaction identifiers.

In various embodiments, the utilization of a request stack having a fixed length (e.g., fixed quantity of stored interaction identifiers) may provide a mechanism to control storage and bandwidth throughout the service-oriented system. For example, the service-oriented system of various embodiments may in some cases receive numerous (e.g., thousands, millions, or some other quantity) of service requests per a given time period (e.g., per day, per week, or some other time period), such as requests from network-based browsers (e.g., web browsers) on client systems or requests from computer systems consuming network-based services (e.g., web services). In some embodiments, a request identifier adhering to the format of request identifier 2100 may be generated for each of such requests and each of any subsequent child requests. Due to the sheer number of requests that may be handled by the service-oriented systems of various embodiments, even when the request stack of a single request identifier is of a relatively small size (e.g., a few bytes), the implications on storage and bandwidth of the overall system may in some cases be significant. Accordingly, various embodiments may include ensuring that each request identifier contains a request stack equal to and/or less than a fixed stack size (e.g., a fixed quantity of interaction identifiers). Similarly, various embodiments may include fixing the length of each interaction identifier stored as part of the request stack (e.g., each interaction identifier could be limited to a single byte, or some other size). By utilizing interaction identifiers of fixed size and/or a request stack of a fixed size, various embodiments may be configured to control the bandwidth and/or storage utilization of the service-oriented system described herein. For instance, in one example, historical request traffic (e.g., the number of requests handled by the service oriented system per a given time period) may be monitored to determine an optimal request stack size and/or interaction identifier size in order to prevent exceeding the bandwidth or storage limitations of the service-oriented system.

In various embodiments, the utilization of a request stack having a fixed length (e.g., fixed quantity of stored interaction identifiers) may provide a mechanism to control one or more fault tolerance requirements of the system including but not limited to durability with respect to data loss and other errors (associated with individual services and host systems as well as the entire service-oriented system). For example, in some embodiments, the larger the size of the request stack (e.g., the more interaction identifiers included within a given request identifier), the more fault tolerant the system becomes.

In embodiments where request stack 2140 includes multiple interaction identifiers, the request stack may serve as a history of interaction identifiers. For instance, in the illustrated embodiment, interaction identifier 2130*a*-2130*n* may represent a series of interaction identifiers in ascending chronological order (where interaction identifier 2130*a* corresponds to the oldest service call and interaction identifier 2130*n* corresponds to the most recent service call).

In addition to the illustrated elements, request identifier 2100 may in various embodiments include one or more portions of data for error detection and/or error correction. Examples of such data include but are not limited to various types of checksums.

Figure 11:
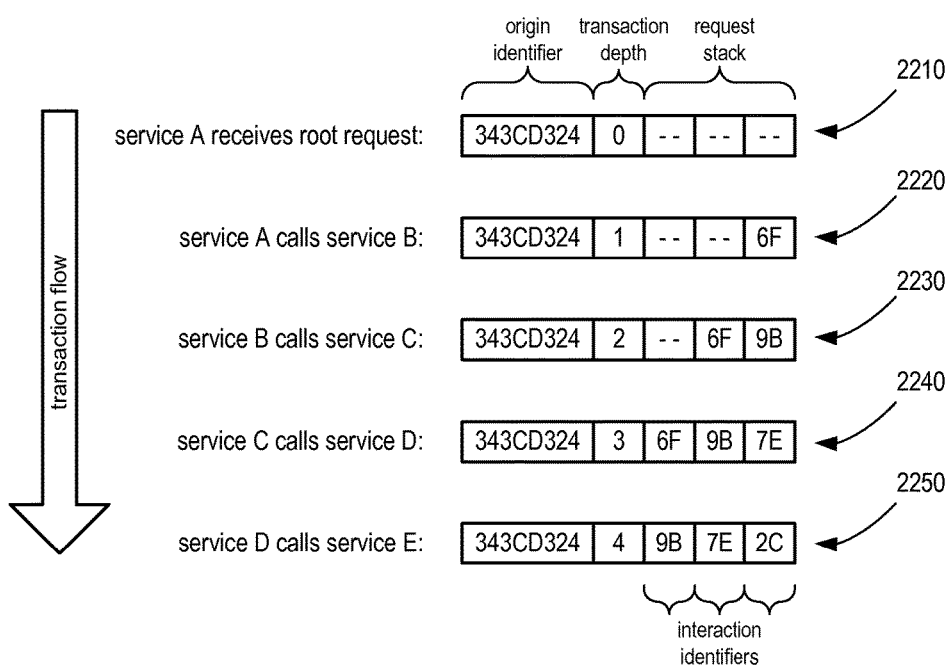
FIG. 11 illustrates an example transaction flow for fulfilling a root request, according to some embodiments.

FIG. 11 illustrates an example transaction flow for a root request and multiple child requests associated with the same root request. As illustrated, the transaction flow may begin with the receipt of a root request by service "A." For instance, this initial request might originate from a client computer system (e.g., from a web browser) or from another computer system requesting a service to consume. To completely fulfill the request, service "A" may perform some quantum of work and/or request the services of another service, such as service "B" (see, e.g., request identifier 2220). Service "B" may call another service "C" (see, e.g., request identifier 2230) and so on as illustrated (see, e.g., request identifiers 2240-2250). As illustrated, since each request identifier 2210-2250 corresponds to a request of the same transaction, each of such request identifiers include the same origin identifier "343CD324." For instance, each of services A-D may embed such origin identifier within each of such request identifiers (described in more detail with respect to FIG. 12). Furthermore, in the illustrated embodiment, the request identifier corresponding to the initial service request includes a transaction depth of 0 since the request identifier is a parent request identifier, as described above. Each subsequent child request identifier includes a transaction identifier equivalent to the previous requests transaction depth plus an increment value. In other embodiments, instead of incremented values, the transaction depths may be values that uniquely identify a transaction depth with respect to other depths of a given call graph; such values may but need not be increments of each other.

In the illustrated example, each request identifier 2210-2250 includes a request stack of a fixed size (e.g., three interaction identifiers). In other embodiments, larger or smaller request stacks may be utilized as long as the request stack includes at least one interaction identifier. Furthermore, in some embodiments, request stack sizes may be of uniform size across the service-oriented system (as is the case in the illustrated embodiment). However, in other embodiments, subsets of services may have different request stack sizes. For instance, a portion of the service-oriented system may utilize a particular fixed stack size for request identifiers whereas another portion of the service-oriented system may utilize another fixed stack fixed stack size for request identifiers.

Figure 12:
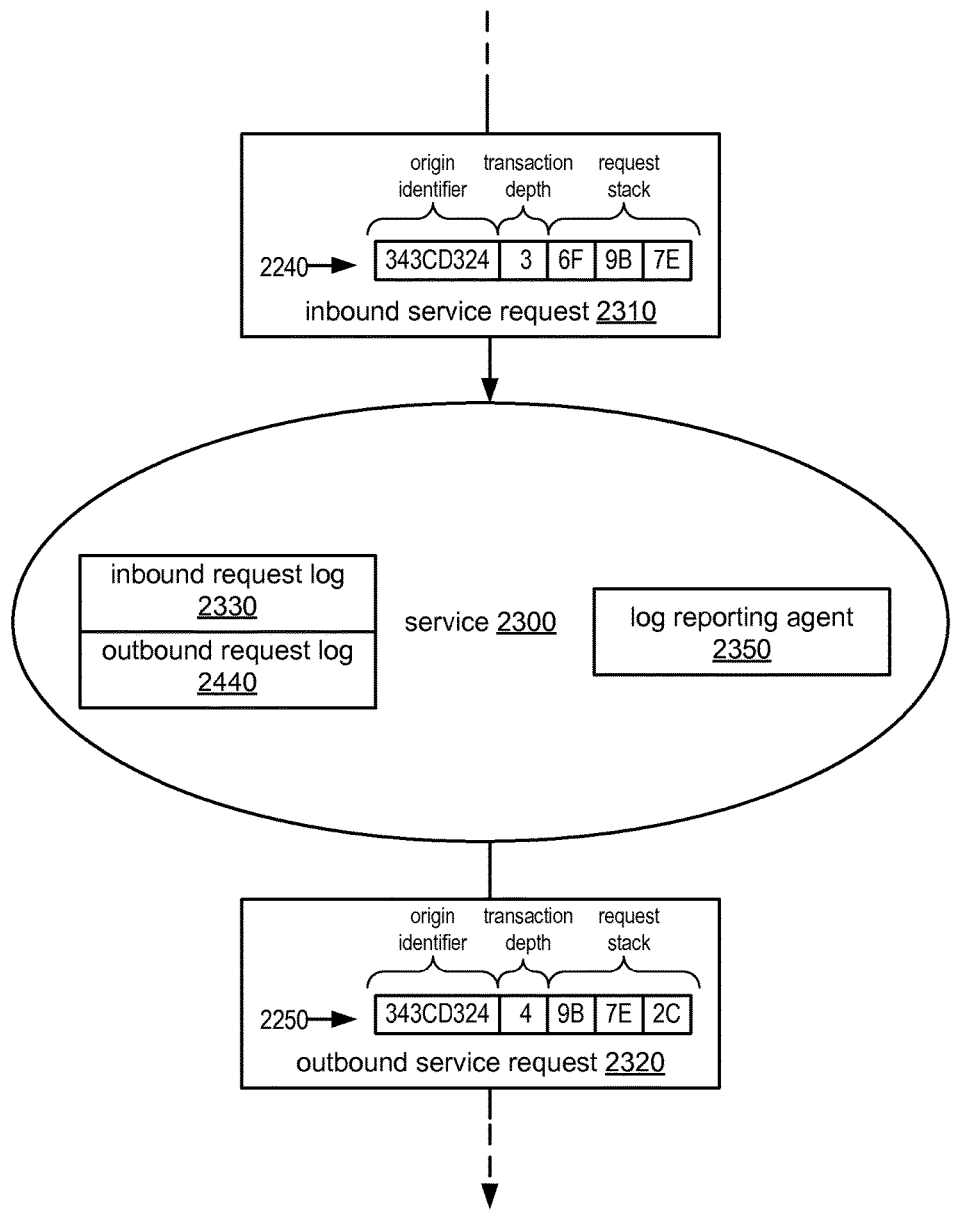
FIG. 12 illustrates one example of a service of a service-oriented system, according to some embodiments.

Referring collectively to FIG. 11 and FIG. 12, a representation of the receipt of an inbound service request (or service call) 2310 as well as the issuance of an outbound request 2320 by service 2300 is illustrated. Request identifiers 2240 and 2250 of FIG. 12 may correspond to the like-numbered elements of FIG. 11. As illustrated, service 2300 may receive an inbound service request 2310. Service 2300 may receive the inbound service request from another service within the service-oriented system, according to various embodiments. Inbound service request 2310 may include the requisite instructions or commands for invoking service 2300. In various embodiments, inbound service request 2310 may also include a request identifier 2240, which may include values for an origin identifier, transaction depth, and request stack, as described above with respect to FIG. 11. In various embodiments, request identifier 2240 may be embedded within inbound service request 2310 (e.g., as metadata). For example, according to various embodiments, the request identifier may be presented as part of metadata in a service framework, as part of a Hypertext Transfer Protocol (HTTP) header, as part of a SOAP header, as part of a Representational State Transfer (REST) protocol, as part of a remote procedural call (RPC), or as part of metadata of some other protocol, whether such protocol is presently known or developed in the future. In other embodiments, request identifier 2240 may be transmitted to service 2300 as an element separate from inbound service request 2310. In various embodiments, request identifier 2240 may be located elsewhere and inbound service request 2310 may include information (e.g., a pointer or memory address) for accessing the request identifier at that location.

In response to receiving the inbound service request, service 2300 may perform a designated function or quantum of work associated with the request, such as processing requests from client computer systems or computer systems requesting web services. In various embodiments, service 2300 may be configured to store a copy of request identifier 2240 within inbound log 2330. In some cases, service 2300 may require the services of another service in order to fulfill a particular request, as illustrated by the transmission of outbound service request 2320.

As is the case in the illustrated embodiment, service 2300 may be configured to send one or more outbound service requests 2320 to one or more other services in order to fulfill the corresponding root request. Such outbound service requests may also include a request identifier 2250 based at least in part on the received request identifier 2240. Request identifier 2250 may be generated by service 2300 or some other component with which service 2300 is configured to coordinate. Since outbound service request 2320 is caused at least in part by inbound service request 2310 (i.e., request 2320 stems from request 2310), the outbound service request 2320 and the inbound service request 2310 can be considered to be constituents of the same call graph. Accordingly, service 2300 (or some other component of the service-oriented framework) may be configured to generate request identifier 2250 such that the request identifier includes the same origin identifier as that of the inbound service request 2310. In the illustrated embodiment, such origin identifier is illustrated as "343CD324" for purposes of example. For instance, in one embodiment, service 2300 may be configured to determine the value of the origin identifier of the request identifier of the inbound service request and write that same value into the request identifier of an outbound service request. In various embodiments, service 2300 (or some other component of the service-oriented framework) may also be configured to generate request identifier 2250 such that the request identifier includes a transaction depth value that indicates the transaction depth level is one level deeper than the transaction depth of the parent request (e.g., inbound service request 2310). For instance, in one embodiment, any given call graph may have various depths that each have their own depth identifier. In some embodiments, such depth identifiers may be sequential. Accordingly, in order to generate request identifier 2250 such that it includes a transaction depth value that indicates the transaction depth level is one level deeper than the transaction depth of the parent request (e.g., inbound service request 2310), service 2300 may be configured to determine the value of the transaction depth from the parent request, sum that value with an increment value (e.g., 1, or some other increment value), and store the result of such summation as the transaction depth value of the request identifier of the outbound service request. In the illustrated embodiment, the transaction depth value of the inbound request identifier 2240 is 3 whereas the transaction depth value of the outbound request identifier 2250 is 4.

In some cases, transaction depth identifiers may instead have identifiers that are not necessarily related to each other sequentially. Accordingly, in some embodiments, service 2300 may be configured to determine the transaction depth value from the request identifier of the parent request. From that value, service 2300 may determine the actual depth level corresponding to the transaction depth value (e.g., via a lookup table that provides a sequential listing of transaction depth levels to corresponding transaction depth values). From that depth level, service 2300 may be configured to determine the next sequential transaction depth (e.g., via a lookup table that provides a sequential listing of transaction depth levels to corresponding transaction depth values) as well as the transaction depth value corresponding to that transaction depth. Service 2300 may be configured to store such transaction depth value as the transaction depth value of the request identifier of the outbound service request.

Service 2300 may also be configured to generate request identifier 2250 of the outbound service request such that the request identifier has a request stack that includes an interaction identifier associated with the outbound service request and all of the interaction identifiers of the request stack of request identifier 2240 except for the oldest interaction identifier, which in many cases may also be the interaction identifier corresponding to a request at the highest transaction depth level when compared to the transaction depth levels associated with the other interaction identifiers of the request stack. For example, the root request may occur at transaction depth "0," a subsequent request may occur at transaction depth "1," another subsequent request may occur at transaction depth "2," and so on. In some respects, the request stack may operate in a fashion similar to that of a first in, first out (FIFO) buffer, as described in more detail below.

To generate the request stack of request identifier 2250, service 2300 may be configured to determine the interaction identifiers present within the request stack of request identifier 2240. Service 2300 may also be configured to determine the size of the request stack that is to be included within request identifier 2250 (i.e., the quantity of interaction identifiers to be included within the request stack). In some embodiments, this size may be specified by service 2300, another service within the service-oriented system (e.g., the service that is to receive request 2320), or some other component of the service-oriented system (e.g., a component storing a configuration file that specifies the size). In other embodiments, the size of the request stack may be specified by service 2300. In one embodiment, the size of the request stack may be dynamically determined by service 2300 (or some other component of the service-oriented system). For instance, service 2300 may be configured to dynamically determine the size of the request stack based on capacity and/or utilization of system bandwidth and/or system storage. In one example, service 2300 may be configured to determine that bandwidth utilization has reached a utilization threshold (e.g., a threshold set by an administrator). In response to such determination, service 2300 may be configured to utilize a smaller request stack size in order to conserve bandwidth. In various embodiments, a similar approach may be applied to storage utilization.

Dependent upon the size of the inbound request stack and the determined size of the outbound request stack (as described above), a number of different techniques may be utilized to generate the request stack of request identifier 2250, as described herein. In one scenario, the size of the inbound request stack may be the same as the determined size of the outbound request stack, as is the case in the illustrated embodiment. In this scenario, if the size of the outbound service request stack is to be n interaction identifiers, service 2300 may be configured to determine the (n−1) most recent interaction identifiers of the request stack of the inbound request identifier. Service 2300 may be configured to embed the (n−1) most recent interaction identifiers of the inbound request stack into the request stack of the outbound request identifier 2250 in addition to a new interaction identifier that corresponds to request 2320 issued by service 2300. In the illustrated embodiment, for each request identifier, the oldest interaction identifier is illustrated on the leftmost portion of the request stack and the newest interaction identifier is illustrated on the rightmost portion. In the illustrated embodiment, to generate the request stack of the outbound request identifier, service 300 may be configured to take the request stack of the inbound request identifier, drop the leftmost (e.g., oldest) interaction identifier, shift all other interaction identifiers to the left by one position, insert a newly generated interaction identifier for the outbound request, and embed this newly generated request stack in the request identifier of the outbound request.

In another scenario, the size of the request stack of the inbound service request identifier 2240 may be less than the size of the determined request stack size for the outbound service request identifier 2250. In these cases, the request stack size of the outbound service request may enable all of the interaction identifiers of the request stack of the inbound service request identifier to be included within the request stack of the outbound service request identifier. Accordingly, in various embodiments, service 2300 may be configured to embed all of the interaction identifiers in the request stack of the outbound request identifier 2250 in addition to a new interaction identifier that corresponds to request 2320 issued by service 2300.

In an additional scenario, the size of the request stack of the inbound service request identifier 2240 may be greater than the size of the determined request stack size for the outbound service request identifier 2250. For instance, if the size of the request stack for the outbound service request identifier is m interaction identifiers and the size of the request stack for the inbound request identifier is m+x interaction identifiers (where x and m are positive integers), service 2300 may be configured to determine the (m−1) most recent interaction identifiers of the request stack of the inbound request identifier. Service 2300 may also be configured to embed such (m−1) most recent interaction identifiers of the request stack of the inbound request identifier into the request stack of the outbound request identifier in addition to a new interaction identifier that corresponds to request issued by service 2300.

As described above, inbound request log 2330 may be managed by service 2300 and include records of one or more inbound service requests. In one embodiment, for each inbound service request received, service 2300 may be configured to store that request's identifier (which may include an origin identifier, transaction depth, and request stack, as illustrated) within the inbound request log. In various embodiments, service 2300 may also store within the log various metadata associated with each inbound service request identifier. Such metadata may include but is not limited to timestamps (e.g., a timestamp included within the request, such as a timestamp of when the request was generated, or a timestamp generated upon receiving the request, such as a timestamp of when the request was received by service 2300), the particular quantum of work performed in response to the request, and/or any errors encountered while processing the request. In various embodiments, outbound request log 2340 may include information similar to that of inbound request log 2330. For example, for each outbound request issued, service 2300 may store a record of such request within outbound request log 2340. For instance, service 2300 may, for each outbound request, store that request's identifier within outbound request log 2340. As is the case with inbound request log 2330, service 2300 may also store within outbound request log 2340 various metadata associated with requests including but not limited to metadata such as timestamps and errors encountered.

Figure 13:
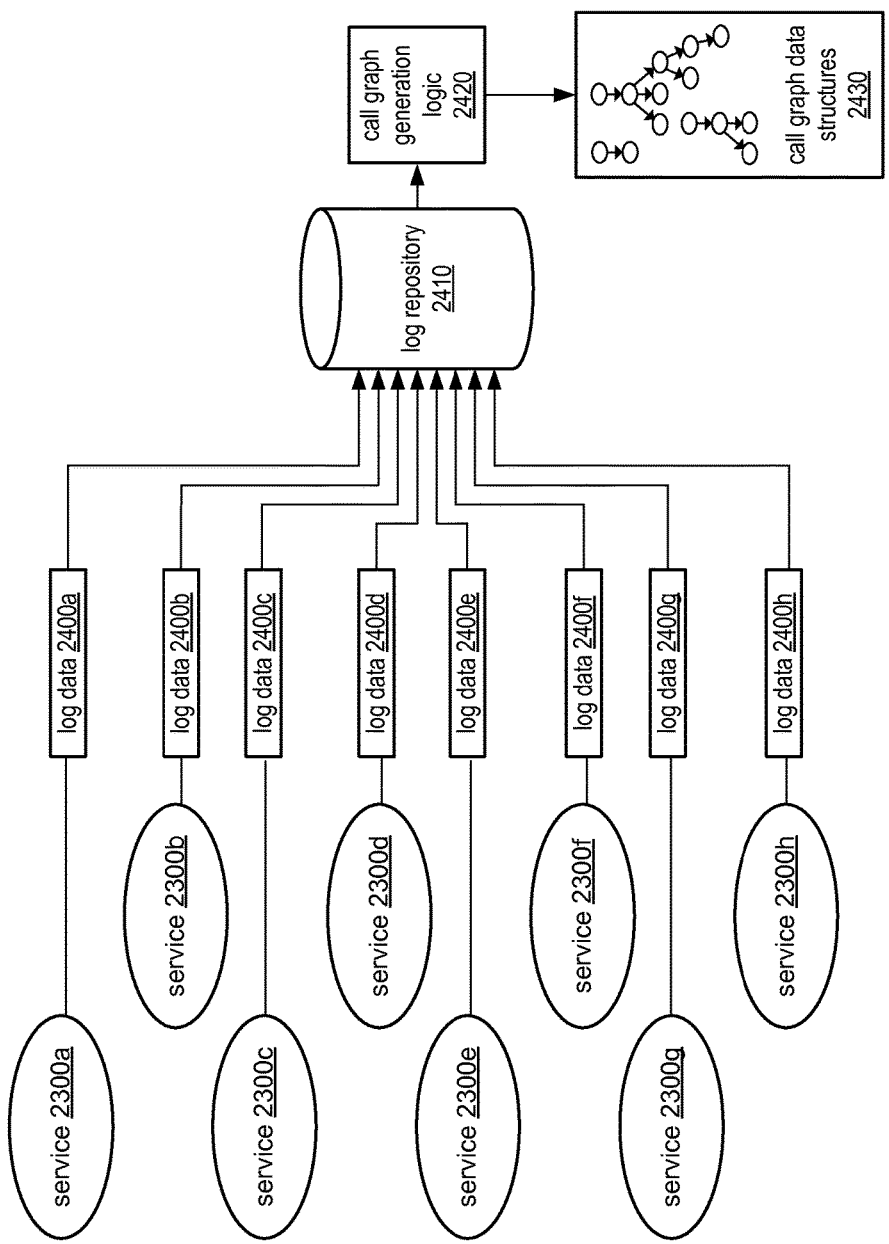
FIG. 13 illustrates an example data flow diagram for the collection of log data and generation of a call graph, according to some embodiments.

Referring collectively to FIG. 12 and FIG. 13, each service within the service-oriented system may include a log reporting agent, such as log reporting agent 2350. Log reporting agent 2350 may in various embodiments report the contents of inbound request log 2330 and/or outbound request log 2340 to a log repository (e.g., a data store, such as a database or other location in memory). One example of such a repository is illustrated log repository 2410 of FIG. 13. Various protocols for transmitting records from the logs of a service 2300 to a log repository may be utilized according to various embodiments. In some embodiments, the log reporting agent may periodically or aperiodically provide log information to the log repository. In various embodiments, the log reporting agent may be configured to service requests for log information, such as a request from the log repository or some other component of the service-oriented system. In some embodiments, in addition to or as an alternative to reporting log information from logs 2330 and 2340, log reporting agent 2350 may report log information to the log repository in real-time (in some cases bypassing the storage of information within the logs altogether). For instance, as a request is detected or generated, the log reporting agent may immediately report the information to the log repository. In various embodiments, log data may specify, for each request identifier, the service that generated the request identifier and/or the service that received the request identifier.

As illustrated in FIG. 13, multiple services 2300a-2300h within the service-oriented system may be configured to transmit respective log data 2400a-2400h to log repository 2410. The data stored within log repository 2410 (e.g., service request identifiers and associated metadata) may be accessed by call graph generation logic 2420. Call graph generation logic may be configured to generate a data structure representing one or more call graphs, such as call graph data structures 2430. As described above, the particular services called to fulfill a root request may be represented as a call graph that specifies, for a particular service called, the service that called the particular service and any services called by the particular service. For instance, since a root request may result in a service call which may propagate into multiple other services calls throughout the service oriented system, a call graph may in some cases include a deep and broad tree with multiple branches each representing a sequences of service calls.

Figure 14:
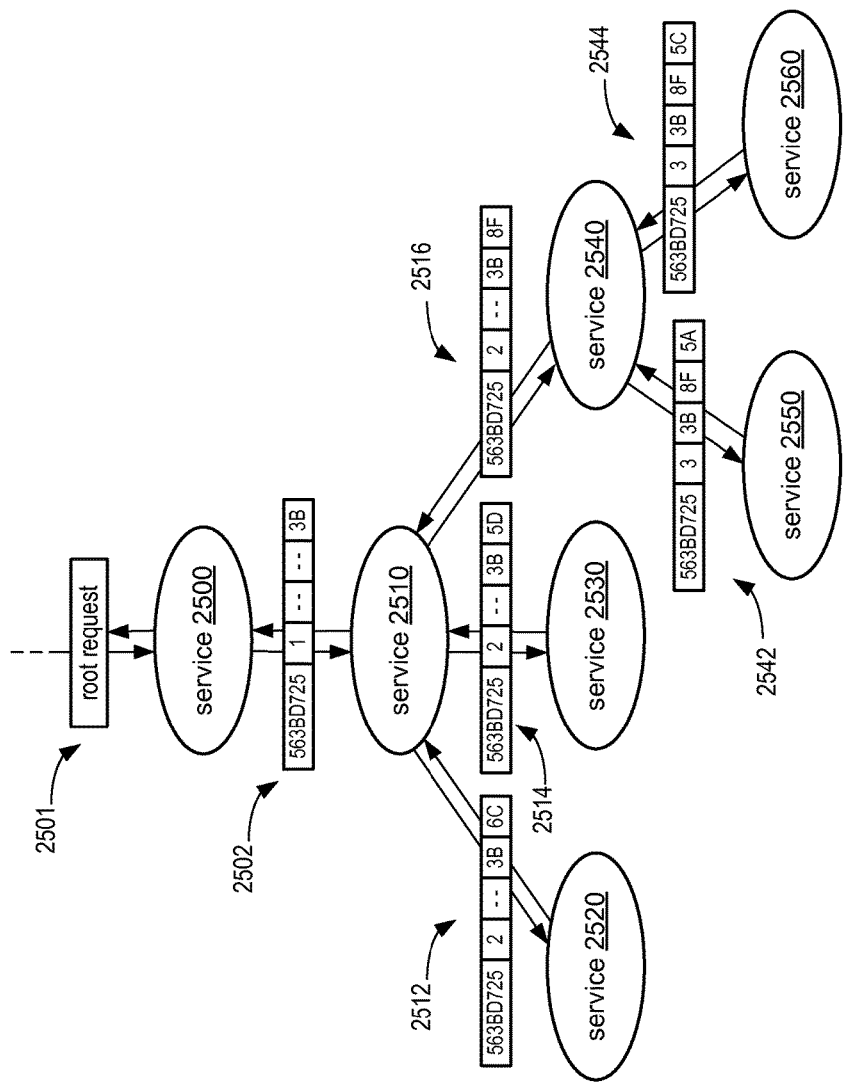
FIG. 14 illustrates an example visual representation of a call graph and request identifiers from which such call graph is generated, according to some embodiments.

FIG. 14 illustrates a visual representation of such a call graph data structure that may be generated by call graph generation logic 2420. In various embodiments, a call graph data structure may include any data structure that specifies, for a given root request, all the services called to fulfill that root request. Note that while FIG. 14 and the associated description pertain to an acyclic call graph, this representation is not inclusive of all variations possible for such a call graph. For instance, in other embodiments, a call graph may be represented by any directed graph (including graphs that include directed cycles) dependent on the nature of the service requests within the service-oriented system. Additionally, for a given one of such services, the call graph data structure may specify the service that called the given service as well as any services called by the given service. The call graph data structure may additionally indicate a hierarchy level of a particular service within a call graph. For instance, in the illustrated embodiment, service 2500 is illustrated as a part of the first level of the hierarchy, service 2510 is illustrated as part of the second level of the hierarchy and so on.

To generate such a call graph, call graph generation logic may be configured to collect request identifiers (e.g., request identifiers 2502, 2512, 2514, 2516, 2542 and 2544) that each include the same origin identifier. In the illustrated embodiment, "563BD725" denotes an example of such an origin identifier. In various embodiments, call graph generation logic may mine (e.g., perform a search or other data analysis) log data associated with various services in order to find a collection of request identifiers that correspond to the same origin identifier (and thus correspond to the same root request, e.g., root request 2501).

In various embodiments, inbound and outbound request logs may be maintained for each service. In these cases, call graph generation logic 2420 may be configured to compare request identifiers in order to determine that a given service called another service in the process of fulfilling the root request. For example, in one embodiment, the call graph generation logic may compare a request identifier from a given service's outbound request log to the request identifier from another service's inbound request log. If a match is detected, the call graph generation logic may indicate that the service corresponding to that outbound request log called the service corresponding to that inbound request log. For example, call graph generation logic may discover a request identifier equivalent to request identifier 2502 within the outbound request log associated with service 2500. In this example, call graph generation logic may also locate a request identifier equivalent to request identifier 2502 within the inbound log of service 2510. In response to this match, call graph generation logic may indicate that an edge (representing a service call) exists between two particular nodes of the call graph (e.g., the node corresponding to service 2500 and the node corresponding to service 2510). The above-described process may be repeated to determine the illustrated edges that correspond to request identifiers 2512, 2514, 2516, 2542 and 2544. In other embodiments, since the manner in which interaction identifiers are generated may ensure that each interaction identifier is unique for a given depth level and origin identifier, the call graph generation logic may instead search for matching interaction identifiers between request identifiers of adjacent depth levels instead of searching for matching request identifiers.

In other embodiments, only one type of log (e.g., either inbound or outbound) may be maintained for a given service. For example, if only outbound request logs are maintained for each of the services, then the call graph generation logic 2420 may utilize different techniques for determining an edge that represents a service call in the call graph data structure. In one example, call graph generation logic may compare two request identifiers that have adjacent depth values. For instance, in the illustrated embodiment, the call graph generation logic may be configured to compare request identifier 2502 to request identifier 2514, since such request identifiers contain the adjacent depth values of 1 and 2. In this case, the call graph generation logic may determine whether the most recent interaction identifier of request identifier 2502 (e.g., 3B) is equivalent to the 2nd most recent interaction identifier of request identifier 2514 (e.g., 3B). For request identifier 2514, the 2nd most recent interaction identifier is evaluated since the most recent interaction identifier position will be fill with a new interaction identifier inserted by the service that generated request identifier 2514 (in this case, service 2530). In the illustrated embodiment, this comparison returns a match since the values for the interaction identifiers are equivalent. In response to such match, the call graph generation logic may be configured to indicate within the data structure that an edge (representing a service call) exists between service 2500 and 2510.

In various embodiments, the call graph generation logic 2420 may be configured to generate a call graph in the presence of data loss. For instance, consider the case where the service oriented system maintains outbound service logs and the log data for service 2510 is lost, as might be the case in the event of a failure on the host system on which service 2510 runs or in the case of a failure of log repository 2410. Since the request identifiers of various embodiments may include a request stack of multiple interaction identifiers, multiple layers of redundancy may be utilized to overcome a log data loss. In this example, since the outbound log data for service 2510 is lost, request identifiers 2512, 2514, and 2516 may not be available. Accordingly, the call graph generation logic may be configured to utilize a request identifier from a lower depth level to reconstruct the pertinent portion of the call graph. While request identifiers 2512, 2514, and 2516 may be not be available due to data loss, the request identifier 2542 (and 2544) is available. Since request identifier 2542 includes a stack or "history" of interaction identifiers, that request identifier may be utilized to obtain information that would have been available if request identifier 2516 were not lost to data failure. Since request identifier 2542 has a depth level that is two levels lower than the depth level of request identifier 2502, the call graph generation logic may utilize the third most recent (not the second most recent as was the case in the previous example) interaction identifier. In this example, the third most recent interaction identifier is evaluated since that position would contain the interaction identifier generated by service 2500 in the illustrated embodiment. If the call graph generation logic determines that the most recent interaction identifier of request identifier 2502 matches the third most recent interaction identifier of request identifier 2542, the call graph generation logic may determine that service 2500 called service 2510 even if the log data for service 2510 is unavailable (e.g., due to data loss). Accordingly, the call graph generation logic may indicate an edge (representing a service call) exists between service 2500 and service 2510 within the generated call graph data structure.

In addition to the request identifiers described above, metadata relating to service interactions may be collected (e.g., by the log reporting agent 2350) and used in the generation of call graphs. In various embodiments, the metadata includes, but is not limited to, any of the following: a timestamp, an indication of whether the interaction is on the client side or server side, the name or other identifier of the application programming interface (API) invoked for the interaction, the host name, data that describes the environment (e.g., a version number of a production environment or test environment), and/or any other metadata that is suitable for building the call graphs and/or comparing one set of call graphs to another. The collected metadata may be used to determine a graph of service interactions, i.e., by identifying or distinguishing nodes and edges from other nodes and edges. If the metadata includes information identifying a test run and/or the version of an environment, then the metadata may enable reporting of test results (e.g., test coverage metrics and/or reports) by test run and/or environment.

In some embodiments, various metadata may also be included within such call graph data structure, such as timestamps, the particular quantum of work performed in response to a given request, and/or any errors encountered while processing a given request. For example, the illustrated services may record timestamps of when a request is received, when a request is generated, and/or when a request is sent to another service. These timestamps may be appended to the call graph data structure to designate latency times between services (e.g., by calculating the time difference between when a request is sent and when it is received). In other cases, metadata may include error information that indicates any errors encountered or any tasks performed while processing a given request. In some embodiments, such metadata may include host address (e.g., an Internet Protocol address of a host) in order to generate a graph structure that indicates which host machines are processing requests (note that in some embodiments host machines may host multiple different services).

The call trace functionality described herein may be configured to perform a variety of methods. The call graph generation logic described herein may be configured to receive multiple request identifiers, each associated with a respective one of multiple service requests. Each given request identifier may include an origin identifier associated with a root request, a depth value specifying a location of the associated service request within a sequence of service requests, and a request stack including one or more interaction identifiers assigned to a service request issued from one service to another service. For example, receiving multiple request identifiers may in some cases include receiving log data that includes such request identifiers. For instance, the call graph generation logic may receive log data directly from host systems that host the services of the service-oriented system described herein. In some cases, the call graph generation logic may receive log data from one or more log repositories such as log repository 2410 described above. In general, the call graph generation logic may utilize any of the techniques for obtaining request identifiers described above with respect to call graph generation logic 2420.

The call graph generation logic may further, based on multiple ones of the request identifiers that each include an origin identifier associated with a particular root request, generate a data structure that specifies a hierarchy of services called to fulfill that particular root request; wherein, based on one or more of the interaction identifiers and one or more of the depth values, the generated data structure specifies, for a given service of said hierarchy: a parent service that called the given service, and one or more child services called by the given service. For example, in various embodiments, generating the data structure may include determining that each of a subset of the multiple request identifiers includes the same origin identifier as well as indicating each associated service request as a node of the hierarchy within the data structure. Examples of such nodes are illustrated in FIG. 14 as services 2500, 2510, 2520, 2530, 2540, 2550 and 2560. Generating such data structure may also include, for each node within the hierarchy, assigning the node to a level within the hierarchy based on the transaction depth value of the request identifier associated with the service request corresponding to that node. Examples of such depth level values are described above with respect to transaction depth 2120 of FIG. 10. Generating the data structure may also include determining that the request stack of a given node at a given level within the hierarchy includes an interaction identifier that is the same as an interaction identifier of the request stack of another node located within an adjacent level of the hierarchy. In response to determining such match, the call graph generation logic may indicate a service call as an edge between said given node and said other node. Examples of such an edge are illustrated as the edges coupling the nodes of FIG. 14 described above.

In various embodiments, the techniques for analyzing request identifiers and generating a call graph may be performed on an incremental basis. For example, as request identifiers are updated (e.g., as logs and/or log repositories receive new data), the call graph generation logic described herein may be configured to incrementally update the generated call graph data structure to reflect the newly reported requests. In some embodiments, the techniques described herein may be performed on a depth-level basis. For example, as request identifiers are received (e.g., by the log repository or call graph generation logic described herein), each identifier may be categorized (e.g., placed in a categorized directory) based on transaction depth.

In various embodiments, the generated call graph data structures described herein may be utilized for diagnostic purposes. For instance, as described above, the call graph data structure may include metadata, such as a record of error(s) that occur when processing a request. Because this metadata may be associated with specific nodes and/or service calls, various embodiments may include determining sources of errors or faults within the service-oriented system. In some embodiments, the generated call graph data structures described herein may be utilized for analytical purposes. For example, based on call graph data structures generated as described herein, various embodiments may include determining historical paths of service calls and/or path anomalies. For instance, various embodiments may include detecting that, for a given root request, one or more services are being called unnecessarily. For instance, such services may not be needed to fulfill the particular root request. Accordingly, in some embodiments, such services may be culled from processing further requests similar to or the same as the root request that originally initiated the unnecessary service calls (e.g., a re-orchestration process may be employed to modify the particular services called for a particular type of request). By removing such unnecessary service calls, various embodiments may conserve resources such as storage and/or bandwidth. In other embodiments, the generated call graph data structures described herein may be utilized for auditing purposes. For example, in the case that the service oriented system provides network-based services (e.g., web services) to consumers of such services (who may provide remuneration for the consumption of services), such consumers may desire to at least occasionally view information that confirms they are being charged in a fair manner. To provide such information to the consumer, various embodiments may include providing the consumer with various records such as records that indicate how frequent they consume network-based services and in what quantity. Such information may be generated based on the call graph data structures described herein.

In one embodiment, the call graph generation logic may receive a first request identifier associated with an inbound service request. The request identifier may include an origin identifier associated with a root request, a depth value specifying a location of the inbound service request within a sequence of service requests, and a request stack including multiple interaction identifiers each assigned to a respective service request issued from one service to another service of multiple services. One example of receiving such a request identifier is illustrated in FIG. 12 as the receipt of inbound service request identifier 2240 by service 2300.

The call graph generation logic may also generate a new request stack. The new request stack may include all of the interaction identifiers of the first request identifier except for an oldest one of the interaction identifiers. For instance, as illustrated in FIG. 12, the request stack of outbound request identifier 2250 does not include "6F," which is the oldest interaction identifier of the inbound service request identifier 2240. The new request stack may also include a new interaction identifier associated with an outbound service request. For instance, as illustrated in FIG. 12, the request stack of outbound service request identifier 2250 includes a new interaction identifier "2C."

The call graph generation logic may also generate a second request identifier associated with the outbound service request. The second request identifier may include the origin identifier, a new depth value specifying a location of the outbound service request within the sequence of service requests, and the new request stack. One example of such a second request identifier is illustrated as outbound service request identifier 2250 of FIG. 12.

In various embodiments, the call graph generation logic may also generate the new depth value such that the new depth value is a result of incrementing the first depth value. For example, in the illustrated embodiment of FIG. 12, the depth value of the outbound request identifier (i.e., "4") may be the result of incrementing the depth value of the inbound request identifier (i.e., "3"). In various embodiments, the call graph generation logic may store either of (or both of) the first request identifier and the second request identifier as log data accessible to one or more computer systems. For instance, in the illustrated embodiment of FIG. 12, the inbound and outbound request identifiers may be stored in inbound request log 2330 and outbound request log 2340, respectively.

For each of the interactions between the services 2500, 2510, 2520, 2530, 2540, 2550, and 2560, a request path or downstream path is shown. For each of the interactions between the services 2500, 2510, 2520, 2530, 2540, 2550, and 2560, a reply path or upstream path is also shown. In response to each request, the recipient (i.e., downstream) service may send a reply to the requesting (i.e., upstream) service at any appropriate point in time, e.g., after completing the requested operation and receiving replies for any further downstream services called to satisfy the request. A terminal downstream service (i.e., a service that calls no further services) may send a reply to the immediately upstream service upon completion of the requested operation or upon encountering an error that prevents completion of the requested operation. A reply may include any suitable data and/or metadata, such as the output of a requested service in the reply path and/or any error codes or condition codes experienced in the reply path. A reply may also include any suitable element(s) of identifying information from the request stack of the corresponding request, such as the origin identifier and/or interaction identifiers shown in FIG. 10.

Figure 15:
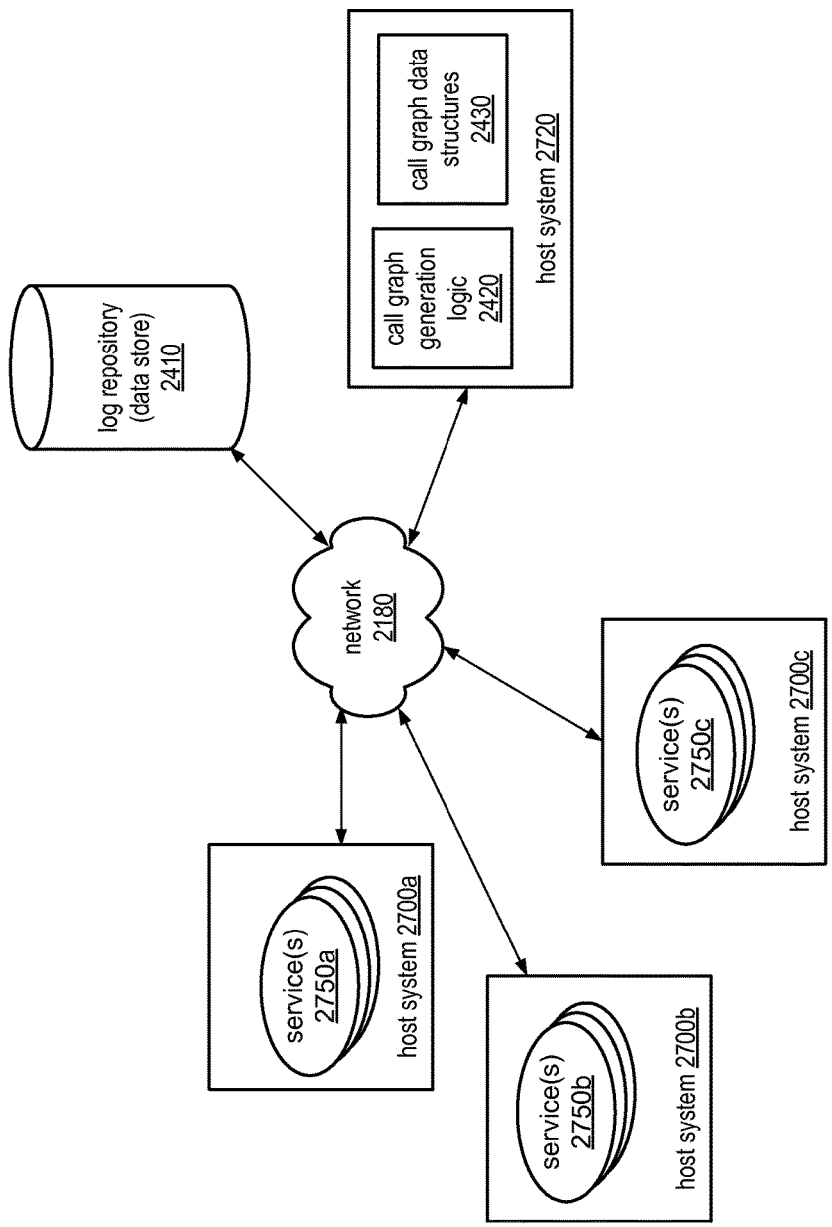
FIG. 15 illustrates an example system configuration for tracking service requests, according to some embodiments.

One example system configuration for tracking service requests is illustrated in FIG. 15. As illustrated, the various components of the example system are coupled together via a network 2180. Network 2180 may include any combination of local area networks (LANs), wide area networks (WANs), some other network configured to communicate data to/from computer systems, or some combination thereof. Each of host systems 2700a-c and 2720 may be implemented by a computer system, such as computer system 3000 described below. Call graph generation logic 2420 may be implemented as software (e.g., program instructions executable by a processor of host system 2720), hardware, or some combination thereof. Call graph data structures 2430 may be generated by host system logic 420 and stored in a memory of host system 2720. Log repository 2410 may be implemented as a data store (e.g., database, memory, or some other element configured to store data) coupled to network 2180. In other embodiments, log repository 2410 may be implemented as a backend system of host system 2720 and accessible to host system 2720 via a separate network. Host system 2700a may be configured to execute program instruction to implement one or more services 2750a. Such services may include but are not limited to one or more of network-based services (e.g., a web service), applications, functions, objects, methods (e.g., objected-oriented methods), subroutines, or any other set of computer-executable instructions. Examples of services 2750 include any of the services described above. Host systems 2700b-c and services 2750b-c may be configured in a similar manner.

In various embodiments, the various services of the illustrated embodiment may be controlled by a common entity. However, in some embodiments, external systems, such as a system controlled by another entity, may be called as part of a sequence of requests for fulfilling a root request. In some cases, the external system may adhere to the request identifier generation techniques described herein and may integrate with the various services described above. In the event that an external system does not adhere to the various techniques for generating request identifiers as described herein, the external system may be treated as a service that is not visible in the call graph or, alternatively, requests sent back from the external system may be treated as new requests altogether (e.g., as root requests). In various embodiments, the system configuration may include one or more proxy systems and/or load balancing systems. In some cases, the system configuration may treat these systems as transparent from a request identifier generation perspective. In other cases, these systems may generate request identifiers according to the techniques described above.

In some embodiments, the service-oriented system described herein may be integrated with other external systems that may utilize different techniques for identifying requests. For instance, the request identifiers described herein may in various embodiments be wrapped or enveloped in additional data (e.g., additional identifiers, headers, etc.) to facilitate compatibility with various external systems.

Illustrative Computer System

In at least some embodiments, a computer system that implements a portion or all of one or more of the technologies described herein may include a computer system that includes or is configured to access one or more computer-readable media. FIG. 16 illustrates such a computing device 3000. In the illustrated embodiment, computing device 3000 includes one or more processors 3010 coupled to a system memory 3020 via an input/output (I/O) interface 3030. Computing device 3000 further includes a network interface 3040 coupled to I/O interface 3030.

In various embodiments, computing device 3000 may be a uniprocessor system including one processor 3010 or a multiprocessor system including several processors 3010 (e.g., two, four, eight, or another suitable number). Processors 3010 may include any suitable processors capable of executing instructions. For example, in various embodiments, processors 3010 may be general-purpose or embedded processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA.

System memory 3020 may be configured to store program instructions and data accessible by processor(s) 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processor 3010, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computing device 3000 and other devices 3060 attached to a network or networks 3050. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above for implementing embodiments of the corresponding methods and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 3000 via I/O interface 3030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. Further, a computer-readable medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 16 may be used to implement the described functionality in various embodiments; for example, software components running on a variety of different devices and servers may collaborate to provide the functionality. In some embodiments, portions of the described functionality may be implemented using storage devices, network devices, or computer systems. The term "computing device," as used herein, refers to at least all these types of devices, and is not limited to these types of devices.

Various embodiments may further include receiving, sending, or storing instructions and/or data implemented in accordance with the foregoing description upon a computer-readable medium. Generally speaking, a computer-readable medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-readable medium may also include transmission media or signals such as electrical, electromagnetic, or digital signals, conveyed via a communication medium such as network and/or a wireless link.

The various methods as illustrated in the Figures and described herein represent examples of embodiments of methods. The methods may be implemented in software, hardware, or a combination thereof. In various of the methods, the order of the steps may be changed, and various elements may be added, reordered, combined, omitted, modified, etc. Various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
   one or more computing devices configured to implement a load testing system, wherein the load testing system:
   receives a request to approve load testing for a service;
   initiates, responsive to the request to approve load testing, one or more test calls to the service, wherein a call trace functionality is enabled for the one or more test calls;
   identifies, based at least in part on trace information included in one or more responses to the one or more test calls, one or more downstream services upon which the service depends, wherein the trace information is generated by the call trace functionality for the one or more test calls at the downstream services called by the service or by other ones of the downstream services; and
   approves or denies the request to approve load testing for the service based at least in part on an availability of the identified one or more downstream services for load testing, wherein the availability of the one or more downstream services is indicated in a load test registry.

2. The system as recited in claim 1, wherein the load testing system:
   during the load testing for the service, marks the identified one or more downstream services as unavailable for additional load testing in the load test registry.

3. The system as recited in claim 1, wherein the request is approved based at least in part on the availability of the identified one or more downstream services at a current point in time, and wherein the load testing for the service is initiated on or after the current point in time.

4. The system as recited in claim 1, wherein the request is approved based at least in part on the availability of the identified one or more downstream services at a future point in time, and wherein the load testing for the service is initiated on or after the future point in time.

5. A computer-implemented method, comprising:
   receiving a request to approve load testing for a service;
   identifying, responsive to the request to approve load testing, one or more downstream services upon which the service depends, wherein the one or more downstream services are identified based at least in part on using automated discovery that employs trace information from one or more responses to one or more test calls made to at least one of the one or more downstream services;
   determining an availability of the identified one or more downstream services for load testing; and
   approving or denying the request to approve load testing for the service based at least in part on the availability of the identified one or more downstream services for load testing.

6. The method as recited in claim 5, wherein the availability of the identified one or more downstream services for load testing is indicated in a load test registry.

7. The method as recited in claim 6, further comprising:
   during the load testing for the service, marking the one or more downstream services as unavailable for additional load testing in the load test registry.

8. The method as recited in claim 5, wherein the request is approved based at least in part on the availability of the identified one or more downstream services at a current point in time, and wherein the load testing for the service is initiated on or after the current point in time.

9. The method as recited in claim 5, wherein the request is approved based at least in part on the availability of the identified one or more downstream services at a future point in time, and wherein the load testing for the service is initiated on or after the future point in time.

10. The method as recited in claim 5, wherein the availability of individual ones of the identified one or more downstream services for load testing is indicated using authorization in a whitelist, wherein the request is denied if the service is not included in the whitelist for one or more of the downstream services.

11. The method as recited in claim 10, further comprising:
    requesting inclusion of the service in the whitelist based at least in part on denial of the request.

12. The method as recited in claim 10, wherein one or more time windows for availability of individual ones of the identified one or more downstream services are indicated in the whitelist, wherein the request is denied if the request is outside the one or more time windows.

13. The method as recited in claim 5, wherein the request indicates a target throughput, and wherein the request is approved or denied based at least in part on an availability of the target throughput.

14. A non-transitory computer-readable storage medium storing program instructions computer-executable to perform:
    receiving a request to approve load testing for a service;
    initiating, responsive to the request to approve load testing, one or more test calls to the service;
    identifying one or more downstream services upon which the service depends, wherein the one or more downstream services are identified based at least in part on trace information included in one or more responses to the one or more test calls; and
    approving or denying the request to approve load testing for the service based at least in part on an availability of the identified one or more downstream services for load testing, wherein the availability of the identified one or more downstream services for load testing is indicated in a load test registry.

15. The non-transitory computer-readable storage medium as recited in claim 14, wherein the program instructions are further computer-executable to perform:
    during the load testing for the service, marking the one or more downstream services as unavailable for additional load testing in the load test registry.

16. The non-transitory computer-readable storage medium as recited in claim 14, wherein the request is approved based at least in part on the availability of the identified one or more downstream services at a current point in time, and wherein the load testing for the service is initiated on or after the current point in time.

17. The non-transitory computer-readable storage medium as recited in claim 14, wherein the request is approved based at least in part on the availability of the identified one or more downstream services at a future point in time, and wherein the load testing for the service is initiated on or after the future point in time.

18. The non-transitory computer-readable storage medium as recited in claim 14, wherein the availability of individual ones of the identified one or more downstream services for load testing is indicated using authorization in a whitelist, wherein the request is denied if the service is not included in the whitelist for one or more of the downstream services.

* * * * *